United States Patent [19]
Nojima et al.

[11] Patent Number: 5,930,811
[45] Date of Patent: Jul. 27, 1999

[54] DOCUMENT PROCESSING APPARATUS

[75] Inventors: Shinichi Nojima; Sadamichi Matsumoto, both of Kawasaki; Miyuki Sasaki, Nagaoka, all of Japan

[73] Assignee: Fujitsu Limited, Kawasaki, Japan

[21] Appl. No.: 08/736,729

[22] Filed: Oct. 25, 1996

[30] Foreign Application Priority Data

Oct. 27, 1995 [JP] Japan .................................. 7-280284

[51] Int. Cl.$^6$ .................................................. G06T 11/00
[52] U.S. Cl. .......................................................... 707/517
[58] Field of Search .................................. 707/517, 514, 707/513, 524, 525

[56] References Cited

U.S. PATENT DOCUMENTS

| | | | |
|---|---|---|---|
| 5,424,945 | 6/1995 | Bell | 364/419.2 |
| 5,438,512 | 8/1995 | Mantha et al. | 364/419.1 |
| 5,517,621 | 5/1996 | Fukui et al. | 395/148 |
| 5,666,289 | 9/1997 | Watkins | 364/491 |
| 5,669,007 | 9/1997 | Tateishi | 395/779 |

*Primary Examiner*—Joseph H. Feild
*Assistant Examiner*—Alford W. Kindred
*Attorney, Agent, or Firm*—Staas & Halsey

[57] ABSTRACT

A document processing apparatus permitting simplified manipulation for designing a postcard or card and making it possible to create any design readily by visually grasping information on a display screen. The document processing apparatus includes a memory unit for storing layout data and part data and a document/design processing unit. The document/design processing unit displays at least one layout and a list of parts in a screen of a display on the basis of data stored in the memory unit. When one part is selected from a list of parts, the document/design processing unit inserts the part into associated fields in all layouts displayed in a layout area. When part attribute change information for changing the attribute of parts displayed in a parts list area into another attribute is input, the document/design processing unit changes the part attribute of all parts contained in a displayed list of parts into the other attribute.

13 Claims, 31 Drawing Sheets

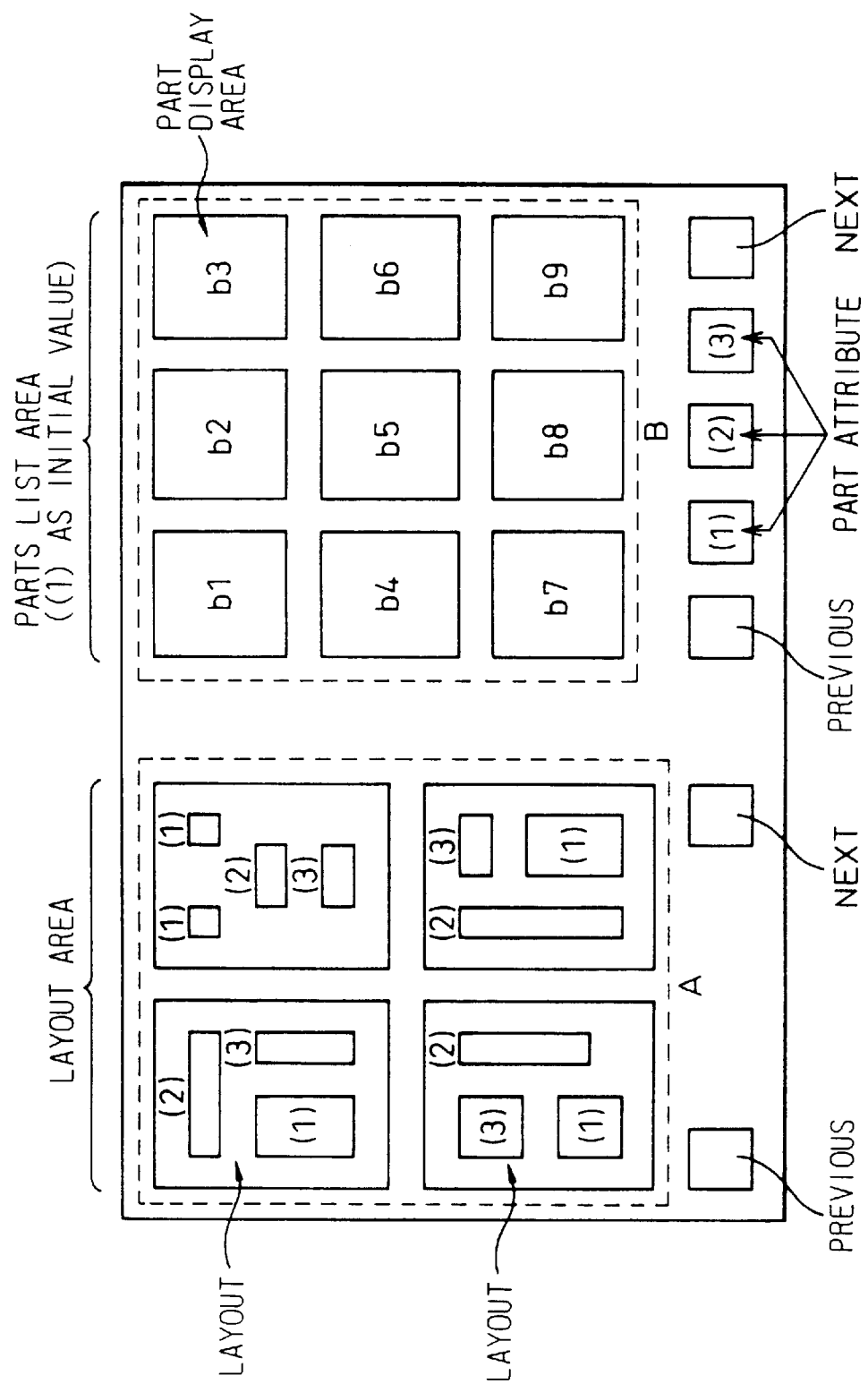

Fig. 26
PRIOR ART

TWELVE ZODIACAL SIGNS

▨ MOUSE···1
◇ MOUSE···2
◇ COW···1
◇ COW···2
◇ TIGER···1
◇ TIGER···2
◇ RABBIT···1
◇ RABBIT···2
◇ RABBIT···3
◇ DRAGON···1
◇ DRAGON···2
◇ SNAKE···1
◇ SNAKE···2
◇ SNAKE···3
◇ SNAKE···4
◇ HORSE···1

← → CANCEL

SELECT ILLUSTRATION AND PRESS EXECUTION KEY

ILLUSTRATION POSTCARD CREATION
(ILLUSTRATION SELECTION)

Fig. 28
PRIOR ART

NEW YEAR'S CARD

◇ WISH REVERENTIALLY YOU A HAPPY NEW YEAR! (CALLIGRAPHY)
◇ WISH RESPECTFULLY YOU A HAPPY NEW YEAR! (CALLIGRAPHY)
◇ A HAPPY NEW YEAR! (CALLIGRAPHY)
◇ I OFFER YOU MY HEARTY WISHES FOR YOUR (CALLIGRAPHY)
HAPPINESS IN THE NEW YEAR.
◇ WISH YOU A HAPPY NEW YEAR! (CALLIGRAPHY)
◇ LET'S GREET THE NEW YEAR! (CALLIGRAPHY) --- 1
▨ LET'S GREET THE NEW YEAR! (CALLIGRAPHY) --- 2
◇ WISH YOU THE JOY OF A NEW YEAR! (CALLIGRAPHY)
◇ FELICITATIONS (CALLIGRAPHY) --- 1
◇ FELICITATIONS (CALLIGRAPHY) --- 2
◇ WISH YOU THE JOY OF A NEW YEAR!
◇ A HAPPY NEW YEAR! ---
◇ WISH RESPECTFULLY YOU A HAPPY NEW YEAR!

SELECT TITLE AND PRESS EXECUTION KEY

ILLUSTRATION POSTCARD CREATION
(TITLE SELECTION)

Fig. 30
PRIOR ART

▨ THANK YOU VERY MUCH FOR YOUR HAVING BEEN KIND TO ME THE PAST YEAR. WOULD YOU KEEP COMPANY WITH ME THIS YEAR, TOO?
JANUARY 1st, 199_

◇ THANK YOU VERY MUCH FOR YOUR HAVING BEEN GOOD TO ME LAST YEAR. I SHALL BE GLAD IF YOU WOULD KEEP COMPANY WITH ME THIS YEAR, TOO. PLEASE SEND MY GOOD WISHES TO YOUR FAMILY.

◇ I AM DEEPLY GRATEFUL TO YOU FOR HAVING BEEN VERY KIND TO ME LAST YEAR. I SHOULD BE GLAD IF YOU WOULD GIVE ME A LEAD THIS YEAR, TOO.

SELECT GREETINGS AND PRESS EXECUTION KEY

NEW YEAR'S CARD

ILLUSTRATION POSTCARD CREATION (GREETINGS SELECTION)

DOCUMENT PROCESSING APPARATUS

BACKGROUND OF THE INVENTION

1. Field of the Invention

The present invention relates to a document processing apparatus capable of arbitrarily combining a sentence, an image, and the like, laying them out, and printing them on a postcard or other various kinds of cards.

2. Description of the Related Art

In a conventional document processing apparatus, a process for designing a New Year's card using a word processor, is carried out according to, for example, the procedure described below.

(1) A layout screen is displayed, and a layout is selected from a list of layout.

(2) A part for a field in a layout is selected from a list of parts in the above layout screen, and a position and size of the part are designated, and the resultant part is inserted into the layout.

(3) For correcting the inserted part, a method is selected from a list of correction methods for each part.

(4) Upon completion of insertion of the part, the resultant data is stored in a flexible disk or the like.

(5) The data store in the flexible disk is read and printed on a postcard.

The problems described below are encountered with the foregoing known apparatus.

(1) When a part for a field in a layout is selected, since the list of parts is expressed with characters, the contents of each part are indiscernible. This is inconvenient.

(2) Since parts are inserted with one layout regarded as an object of insertion, when the layout should be changed to another, layout selection must be resumed and parts must be selected again. Extra work and time are therefore needed.

(3) For printing a result of design, the result cannot be printed until it is stored in a floppy disk. Extra work and time are therefore needed. Besides, the resultant product cannot be seen right away.

SUMMARY OF THE INVENTION

In consideration of the foregoing problems encountered with the prior art, an object of the present invention is to provide a document processing apparatus in which, in the processing of producing document data by inserting parts into a layout for a postcard or any other card and outputting the resultant data, the manipulation for selecting a layout and inserting a part into the selected layout is simplified, and information can be discerned on a display screen, and thus document data of any layout can be processed (easily and shortly. A further object of the present invention is to provide a document processing apparatus for enabling immediate printing and discernment of document data of a finalized layout.

For accomplishing the foregoing objects, according to the present invention, there is provided a document processing apparatus comprising: (a) a memory means for storing layout data for laying out a document and part data of parts capable of being inserted into layouts; and (b) a document/design processing unit for creating a document using a design facility, said unit including (1) a layout/parts list display control means for defining a layout area and parts list area in a screen of a display on the basis of data stored in the memory means, displaying at least one layout in the layout area, and displaying a list of parts capable of being inserted into layouts in the parts list area, and (2) a part insertion means that, when one part selected from a list of parts displayed in the parts list area, inserts the part into an associated field in each layout displayed in the layout area.

BRIEF DESCRIPTION OF THE DRAWINGS

Further features and advantages of the present invention will be apparent from the following description with reference to the accompanying drawings, in which:

FIG. 2A shows the configuration of the apparatus, and FIG. 2B is a schematic view of layout data;

FIG. 3 is an explanatory diagram of a layout/parts list screen in the embodiment;

FIG. 26 shows an illustration selection screen in the prior art;

FIG. 28 shows a title selection screen in the prior art;

FIG. 30 shows a greetings selection screen in the prior art; and

DESCRIPTION OF THE PREFERRED EMBODIMENTS

Before describing the Preferred embodiments according to the present invention, an example of the related art is provided with reference to FIGS. 24 to 31.

In the past, a practical procedure for, for example, designing a New Year's card in Japanese using a word processor has been as described below.

(1) First, a selection screen for selecting various kinds of processing from a menu is displayed as an initial screen appearing on the display screen of the word processor. When an item for, for example, creating a postcard, such as, "Postcard Maker" is selected from the display screen, a layout selection screen shown in FIG. 24 appears. In the layout selection screen, a list of various layouts such as a layout for "vertical writing with a postcard placed lengthwise," layout for "lateral writing with a postcard placed lengthwise," layout for "vertical writing with a postcard placed sideways," and layout for "lateral writing with a postcard placed sideways" is displayed. In this example, the layouts are each formed with a combination of a title 1, illustration 2, and text 3 that are displayed. When any layout is selected from the layout selection screen, the selected layout appears.

Figure 25:
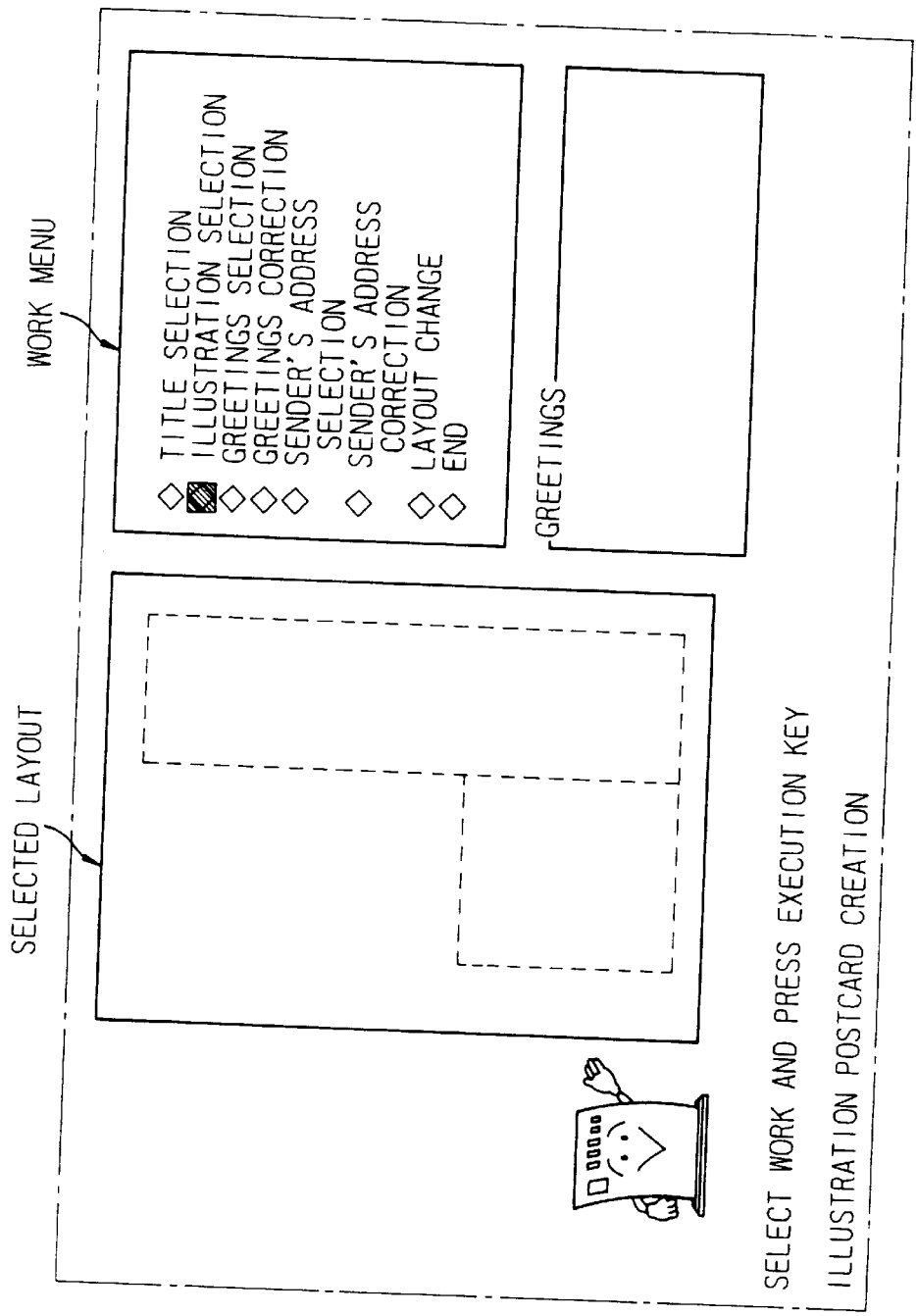
FIG. 25 shows a work selection screen (part 1) in the prior art.

(2) When a layout is selected from the layout selection screen, a work selection screen (part 1) shown in FIG. 25 appears. In this work selection screen (part 1), the selected one layout is displayed and a work menu for selecting subsequent work is displayed. The work menu contains such items as "Title Selection," "Illustration Selection," "Greetings Selection," and so on.

(3) When "Illustration selection" is selected from the work menu, an "illustration selection screen" shown in FIG. 26 appears. In this screen, characters expressing twelve zodiacal signs (mouse, cow, tiger, etc.) are displayed in order to enable display of illustrations.

Figure 27:
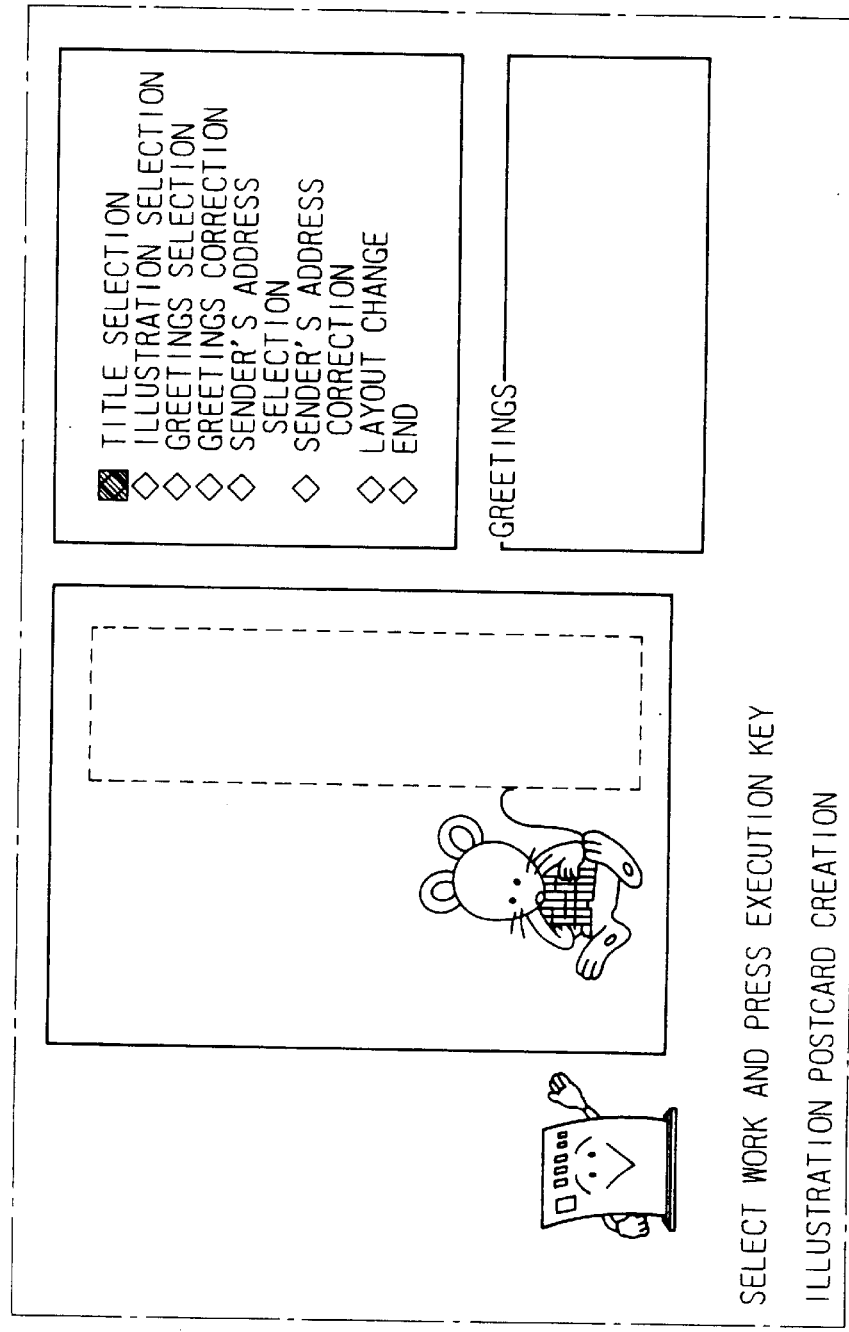
FIG. 27 shows a work selection screen (part 2) in the prior art.

(4) When, for example, "Mouse 1" is selected in the illustration selection screen, the illustration of the selected "Mouse 1" appears in a given field in the layout in a work selection screen (part 2) shown in FIG. 27. Subsequent work can be selected in the work selection screen (part 2).

(5) When "Title Selection" is selected from the menu in the work selection screen (part 2) shown in FIG. 27, a "title selection screen" for a New Year's card shown in FIG. 28 appears. In this title selection screen, various titles written in Japanese are displayed.

Figure 29:
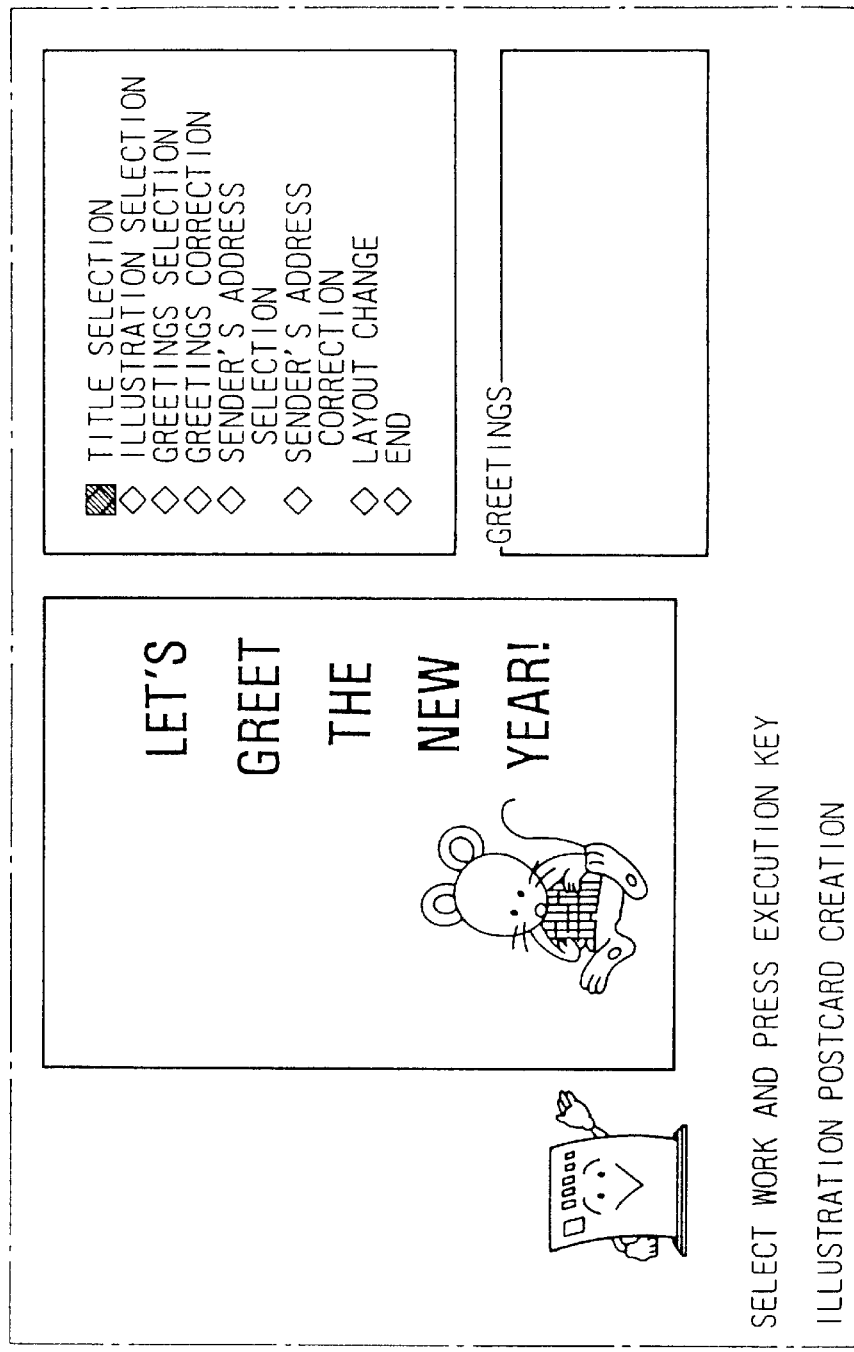
FIG. 29 shows a work selection screen (part 3) in the prior art.

(6) For example, when a certain title is selected in the title selection screen, the title (Japanese) appears together with the illustration of the selected "Mouse 1" in a work selection screen (part 3) shown in FIG. 29.

(7) Thereafter, when "Greetings Selection" is selected from the menu in the work selection screen (part 3) shown in FIG. 29, a "greetings selection screen" shown in FIG. 30 appears. A menu of various greetings written in Japanese and serving as texts to be written in a New Year's card is displayed in the greetings selection screen.

Figure 31:
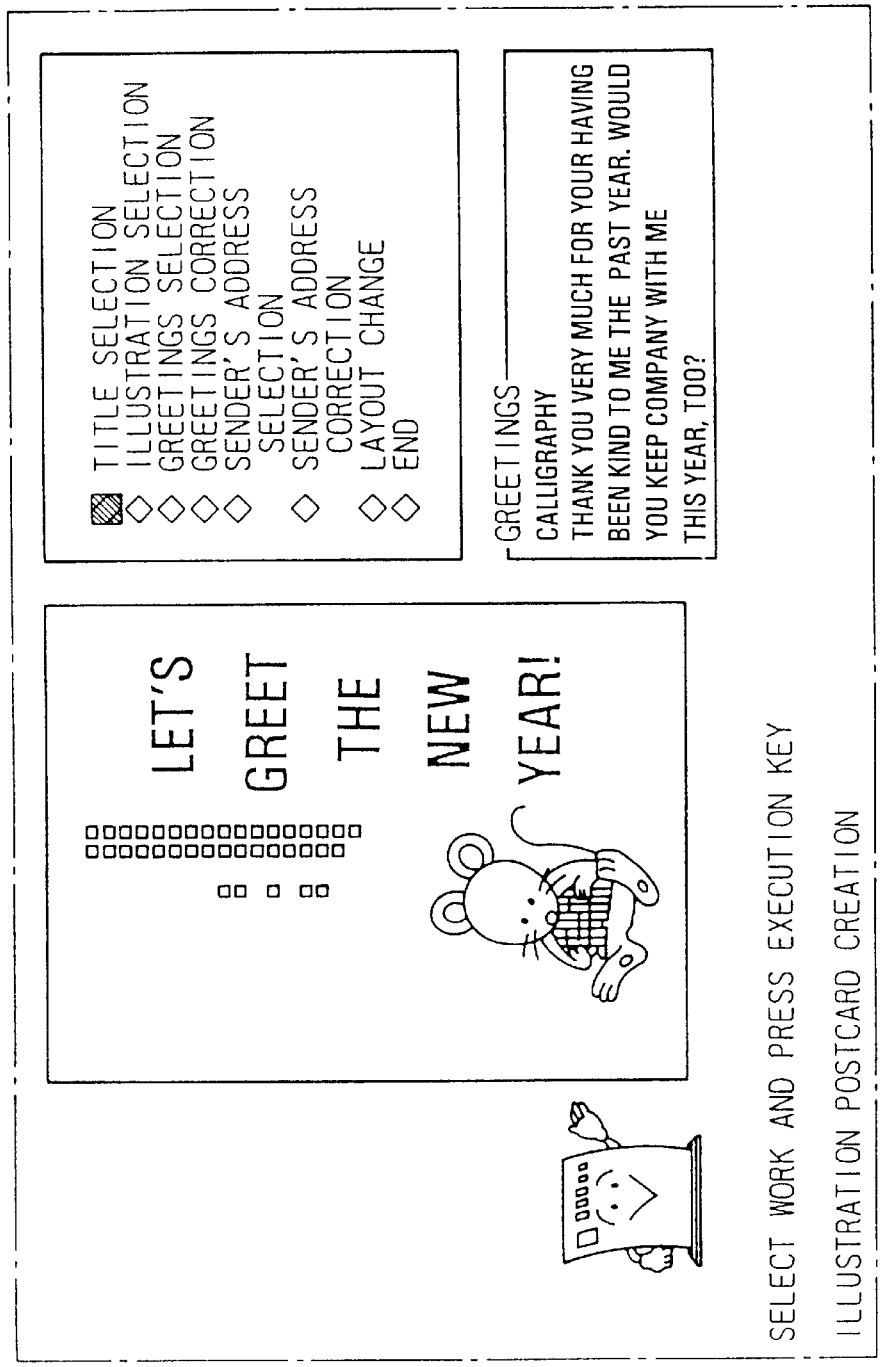
FIG. 31 shows a work selection screen (part 4) in the prior art.

(8) When any of the greetings are selected in the greetings selection screen, the selected illustration, title, and greetings appear in a work selection screen (part 4) as shown in FIG. 31. Thereafter, when such parts as the inserted illustration, title, and greetings should be corrected, a correction method is selected from a list of correction methods for each part.

A document for a New Year's card can be created through the foregoing processing. The document data for the New Year's card is temporarily saved in a flexible disk. For printing, the document data for the New Year's card is read from the flexible disk, output to a printer, and then printed on a postcard.

However, as mentioned above, the problems below are encountered with the known apparatus.

(1) When a part for a field in a layout is selected, since the list of parts is expressed with characters, the contents of each part are indiscernible. This is inconvenient.

(2) Since parts are inserted with one layout regarded as an object of insertion, when the layout should be changed to another, layout selection must be resumed and parts must be selected again. Extra work and time are therefore needed.

(3) When a result of design is printed, the result cannot be printed until it is stored in a floppy disk. Extra work and time are therefore needed. Besides, the resultant produced data cannot be seen right away.

Figure 1:
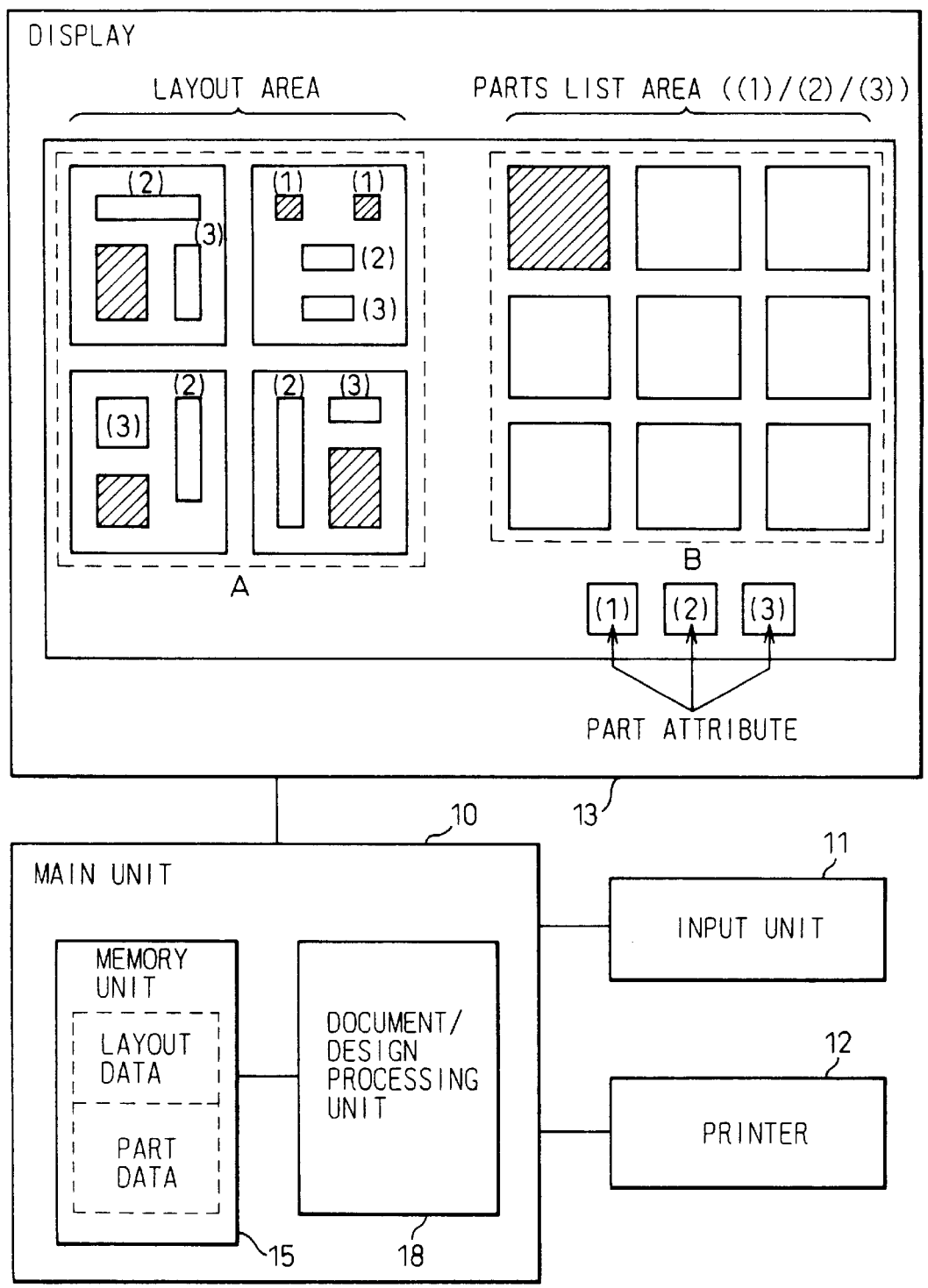
FIG. 1 is a diagram for explaining the principles of the present invention.

Next, the configuration based on the principles of the present invention devised to solve the aforesaid problems will be described. FIG. 1 is a diagram for explaining the principles of the present invention. As illustrated, a document processing apparatus in accordance with the present invention comprises a memory unit 15 for storing layout data for laying out a document containing an image and part data of parts to be inserted into layouts, and a document/design processing unit 18 for creating a document containing an image using a design facility.

The document/design processing unit 18 includes a layout/parts list display control means for giving control so as to define a layout area and a parts list area in a screen of a display 13 on the basis of the data stored in the memory unit 15. At least one layout is displayed in the layout area; and a list of parts capable of being inserted into layouts is displayed in the parts list area. The documentation/design processing unit 18 also includes a part insertion means that, when one part is selected from a list of parts displayed in the parts list area, inserts the selected part into associated fields in all layouts displayed in the layout area.

Herein, according to a second aspect of the present invention, preferably, in the document processing apparatus, the layout/parts list display control means includes a control facility that, when layouts to be displayed in the layout area or a list of parts to be displayed in the parts list area occupies a plurality of pages, updates a page according to input page turn information, and displays layouts and a list of parts for each page.

According to a third aspect of the present invention, preferably, in the document processing apparatus, the layout/parts list display control means includes a control facility that, when part attribute change information for changing the attribute of parts displayed in the parts list area is inputted, changes the attribute of all parts contained in a displayed list of parts according to the part attribute change information.

According to a fourth aspect of the present invention, preferably, in the document processing apparatus, the part insertion means includes a control facility such that, when there are a plurality of pages of layouts, if a page of layouts displayed in the layout area is turned with the input of page turn information, the selected part is inserted in associated fields in all layouts displayed in a new page.

According to a fifth aspect of the present invention, preferably, in the document processing apparatus, the part insertion means includes a control facility that, when part change information for changing a part selected from a list of parts into another is input with displayed layouts fixed, inserts the part into associated fields in all currently-displayed layouts.

According to a sixth aspect of the present invention, preferably, in the document processing apparatus, the layout data stored in the memory unit 15 is layout data containing modification information for modifying a part to be inserted into layouts. Moreover, the part insertion means has a control facility such that when one part is selected from a list of parts, the part according to modification information contained in the layout data is modified and the modified part is inserted into associated fields in all displayed layouts.

According to a seventh aspect of the present invention, preferably, in the document processing apparatus, the part insertion means includes a control facility for inserting an image inputted from a scanner, or a video picture inputted from a video camera, as a part into associated fields in all displayed layouts.

According to an eighth aspect of the present invention, preferably, in the document processing apparatus, the layout/parts List display control means includes a control facility for displaying original documents as parts in a list of parts so that any original document can be selected, and the document/design processing unit 18 includes a processing facility that, when a part of an original document is selected from the list of parts, supports creation of an original document using a documentation support facility.

According to a ninth aspect of the present invention, preferably, in the document processing apparatus, a printer 12 is connected to the main unit 10 of the apparatus, and a RAM for work is included in the memory unit 15. Moreover, the document/design processing unit 18 includes a control facility that produces data for the layout area in the RAM, and that after a layout is finalized, when printout information is inputted, outputs the resultant layout data from the RAM directly to the printer.

According to a tenth aspect of the present invention, preferably, in the document processing apparatus, the attributes of each part contained in a list of parts are an illustration, title, and text. A layout is a layout for outputting the illustration, title, and text on a print medium such as a postcard, card, sheet, or the like.

According to an eleventh aspect of the present invention, preferably, the document processing apparatus further comprises a clock means. Moreover, the layout/parts list display control means changes part data to be read first from the memory means from one data to another according to information indicated by the clock means.

Embodiments of the present invention will be described in conjunction with the drawings. The embodiments to be described below are examples in which a document processing apparatus of the present invention is implemented in a word processor (hereinafter it may be referred to simply as an apparatus). In the description below, an example of creating a New Year's card in Japanese using a design facility will be taken. In this case, a title, illustration, text (greetings or the like), image, and video picture to be inserted into each layout will be termed "parts."

Figure 2A:
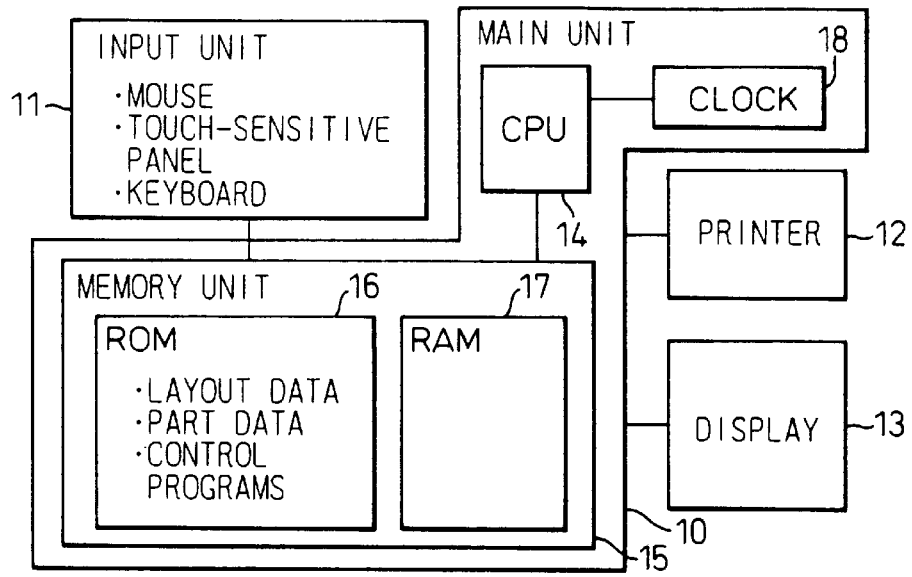
FIGS. 2A and 2B are diagrams for explaining an apparatus of an embodiment.
Figure 2B:
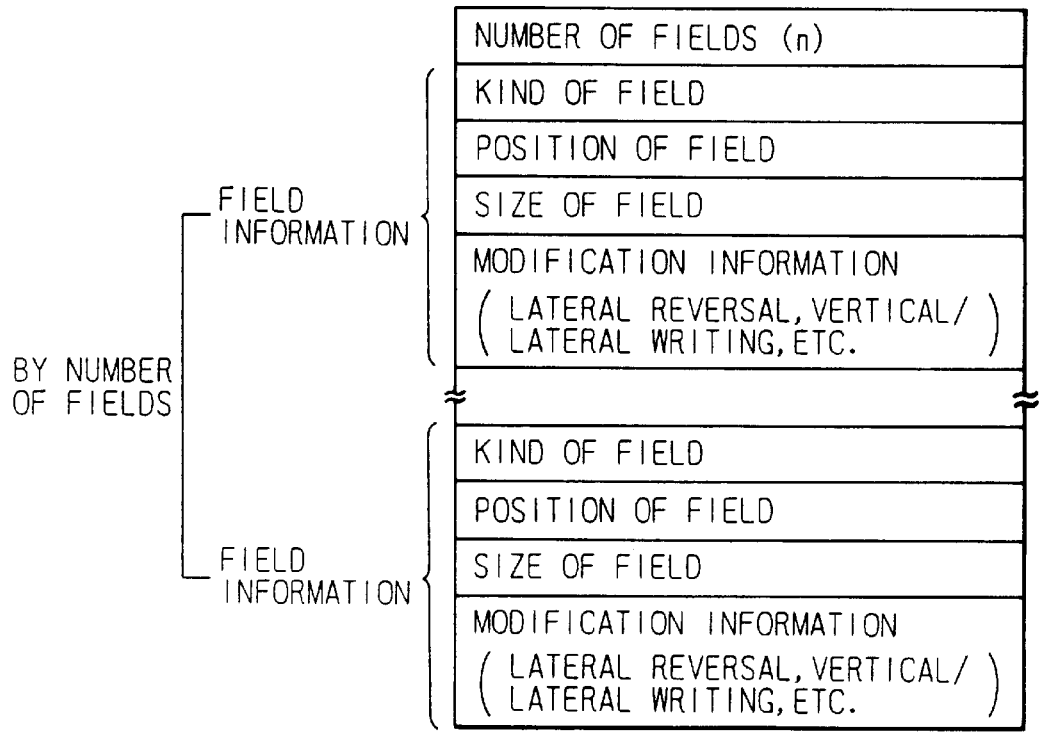

FIGS. 2A and 2B are diagrams for explaining an apparatus of a preferred embodiment of the present invention. FIG. 2A shows the configuration of the apparatus, and FIG. 2B is a schematic diagram of layout data.

The apparatus of the preferred embodiment comprises a main unit 10, and an input unit 11, printer 12, display 13, and the like which are connected to the main unit 10. The main unit 10 includes a CPU 14 and a memory unit 15. The memory unit 15 consists of a ROM 16, RAM 17, and the like. In the main unit 10, a clock 18 for indicating a current date is incorporated. The functions of these components are as described below.

The input unit 11 is formed with a mouse, a touch-sensitive panel (an input unit located on the display screen of the display and used to detect a pressure given by a finger or pen and to locate a pointed position on the display screen on the bas s of the pressurized position), a keyboard, or the like, and is used to instruct various kinds of selections enter data, enter control information, and the like. The drawing of this embodiment shows an example using the touch-sensitive panel.

The printer 12 prints data output from the main unit on a print medium. In this embodiment, a printer having a thermal head as a print head is employed. With the thermal head of the printer, data is printed on a print medium such as various kinds of postcards or cards. The thermal head thermally prints data on a sheet of base paper for printing.

The display 13 displays data processed by the main unit 10. Incidentally, the display 13 of this embodiment includes a liquid-crystal panel. A touch-sensitive panel is overlaid the liquid-crystal panel. Necessary information is entered by touching any position on the display screen of the liquid-crystal panel, that is, on the touch-sensitive panel.

The ROM 16 is a nonvolatile memory for storing layout data, part data, and control programs to be run by the CPU 14. The layout data stored in the ROM 16 is, as shown in FIG. 2B, composed of the number of fields (n) within each layout that is an object of processing, and field information for the number of fields (n).

Each field information is composed of such information as a kind of field (information including the attribute of a part to be inserted into the field), a position (coordinates) of the field, a size of the field, and modification information (lateral reversal, vertical reversal, rotation by any angle, vertical or lateral writing, and the like).

The CPU 14 is a processor for giving various kinds of control within the main unit 10 by running control programs stored in the ROM 16.

The RAM 17 is a memory used as a work area by the CPU 14. Composing a New Year's card, which will be described below, is carried out within the RAM 17.

Figure 4:
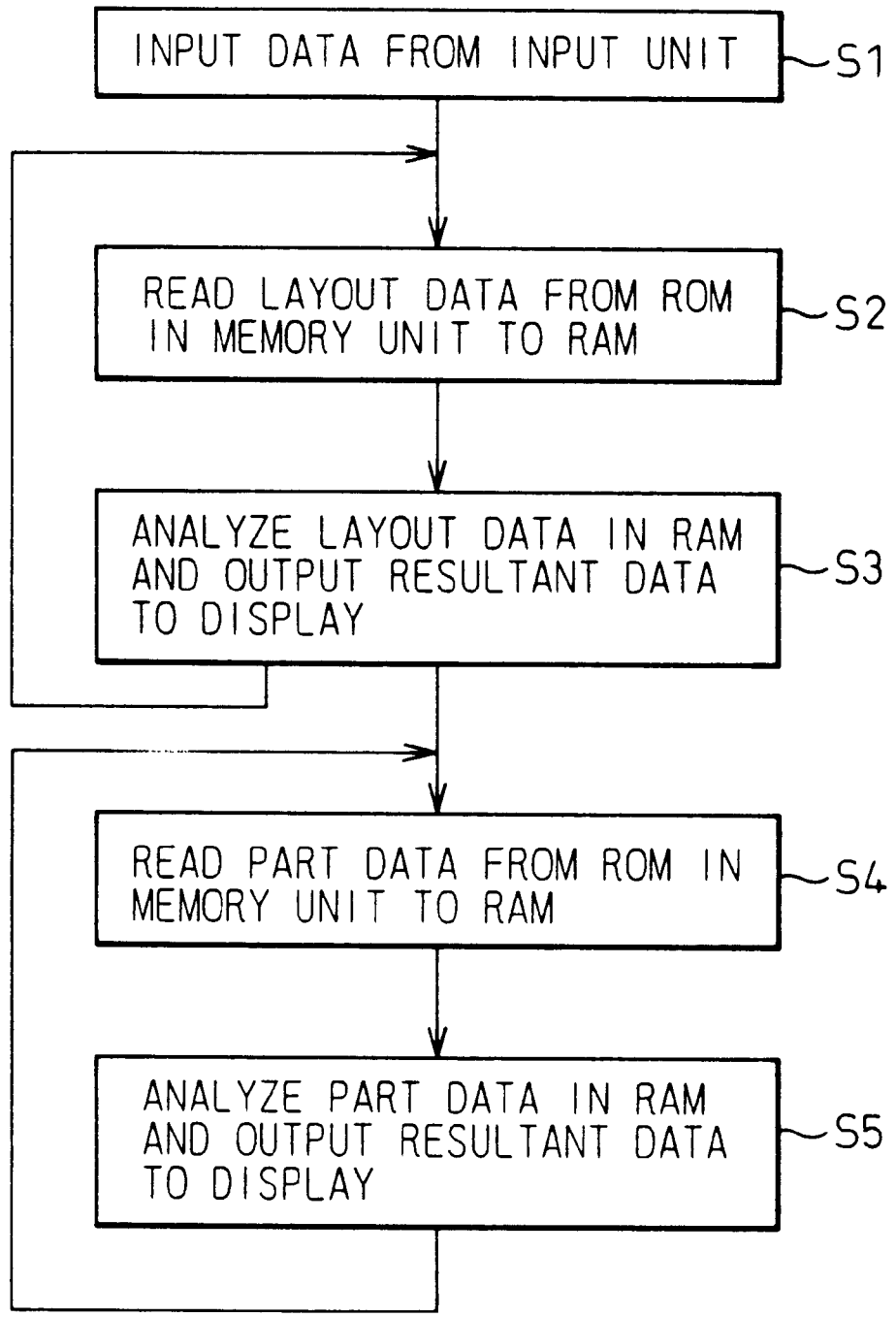
FIG. 4 is a flowchart describing display of the layout/parts list screen in the embodiment.

FIG. 3 is an explanatory diagram of a layout/parts list screen, and FIG. 4 is a flowchart describing display of the layout/parts list screen. Basic processing (display of the layout/parts list screen) will be described below in conjunction with FIGS. 3 and 4. Reference numerals S1 to S5 denote processing steps.

In the apparatus, when a design facility is used to create a New Year's card, a New Year's card can be created automatically by selecting an item from a menu in each displayed screen starting with an initial screen. The procedure is, for example, as described below.

First, when "Design" (an item for selecting a design facility) is selected from a menu in a displayed function selection screen of an initial screen, a menu of various kinds of processing based on the design facility appears. In the processing screen for "Happy New Year's Card" selected from the processing menu, a menu composed of items for creating various kinds of New Year's cards, such as, "Illustration New Year's Card," "Video New Year's Card," and "Scanner New Year's Card" is displayed.

When, for example, the item "Illustration New Year's Card" is selected in the screen, a layout/parts list screen (a screen showing layouts and a lists of parts) used to create an "illustration New Year's card" appears as shown in FIG. 3. In the layout/parts list screen, side A (left-hand side in FIG. 3) of the screen is defined as a layout area and side B (right-hand side in FIG. 3) thereof is defined as a parts list area. A plurality of layouts (layouts for a New Year's card) are displayed in the layout area, while a list of parts (a list of parts to be inserted into layouts) is displayed in the parts list area.

In the layout area, a "Next" key and "Previous" key (keys of the touch-sensitive panel) are displayed. In the parts list area, a "Previous" key, "Part Attribute (1)" key, "Part Attribute (2)" key, "Part Attribute (3)" key, and "Next" key (keys of the touch-sensitive panel) are displayed. The Next key is a key used to display data in a subsequent page, and the Previous key is a key used to display data in a previous page.

In the parts list area a plurality of part display areas b1, b2, b3, etc., and b9 are defined. In the part display areas, parts of a part attribute selected by an operator are displayed. The Part Attribute (1), (2), and (3) keys in the parts list area are keys used to select a part attribute. Parts of a attribute selected with any of these keys are displayed in the part display areas b1, b2, b3, etc., and b9. In this example, part attribute (1) is an illustration, part attribute (2) is a title, and part attribute (3) is a text (greetings or the like).

The contents of a display in the layout/parts list screen are changed continually with selection of a part attribute through an operator's manipulation. In the initial screen, a plurality of layouts alone are displayed in the layout area of side A (parts are not displayed), and a list of parts of part attribute (1) (illustration) is displayed in the parts list area.

Fields in each layout in the layout area are assigned numerals (1), (2), and (3). This means that the kinds of fields are associated with part attributes (1), (2), and (3). For example, the field indicated with (1) is a field into which a part of part attribute (1) is inserted. The field indicated with (2) is a field into which a part of part attribute (2) is inserted. The field indicated with (3) is a field into which a part of part attribute (3) is inserted.

In this screen, when the Previous key displayed is pressed, a previous page appears. When the Next key is pressed, a subsequent page appears. In other words, when layouts or a list of parts occupy a plurality of pages, previous and subsequent pages can be seen by manipulating the Previous key and Next key.

When the item "Illustration New Year's Card" is selected to create a New Year's card, first, the layout/parts list screen is displayed by the display 13 as part of basic processing. In this case, the processing is carried out as described below under the control of the CPU 14 (See FIG. 4).

When selection information for layout insertion is inputted from the input unit 11 (for example, a touch-sensitive panel) through operator' manipulation (S1), the CPU 14 reads layout data from the ROM 16 in the memory unit 15 on the basis of the selection information and stores the data in the RAM 17 (S2).

The CPU 14 then reads layout data from the RAM 17, analyzes it, and outputs the resultant data to the display 13 (S3). The CPU 14 repeats layout display or the processing of steps S2 and S3 by the number of layouts that can be displayed in one screen (one page). Consequently, layouts are displayed in the layout area of side A of the screen shown in FIG. 3.

When the foregoing processing terminates, the CPU 14 reads part data from the ROM 16 in the memory unit 15 and stores the data in the RAM 17 (S4). The CPU 14 then reads part data from the RAM 17, analyzes the data, and outputs the resultant part data to the display 13 (S5).

In this case, since an initial value of a part attribute for a list of parts is part attribute (1), part data of part attribute (1) (illustration) alone is output to the display 13. The CPU 14 repeats part display or the processing of steps S4 and S5 by the number of parts that can be displayed in one screen. Consequently, a list of parts is displayed in side B of the screen shown in FIG. 3.

Figure 5:
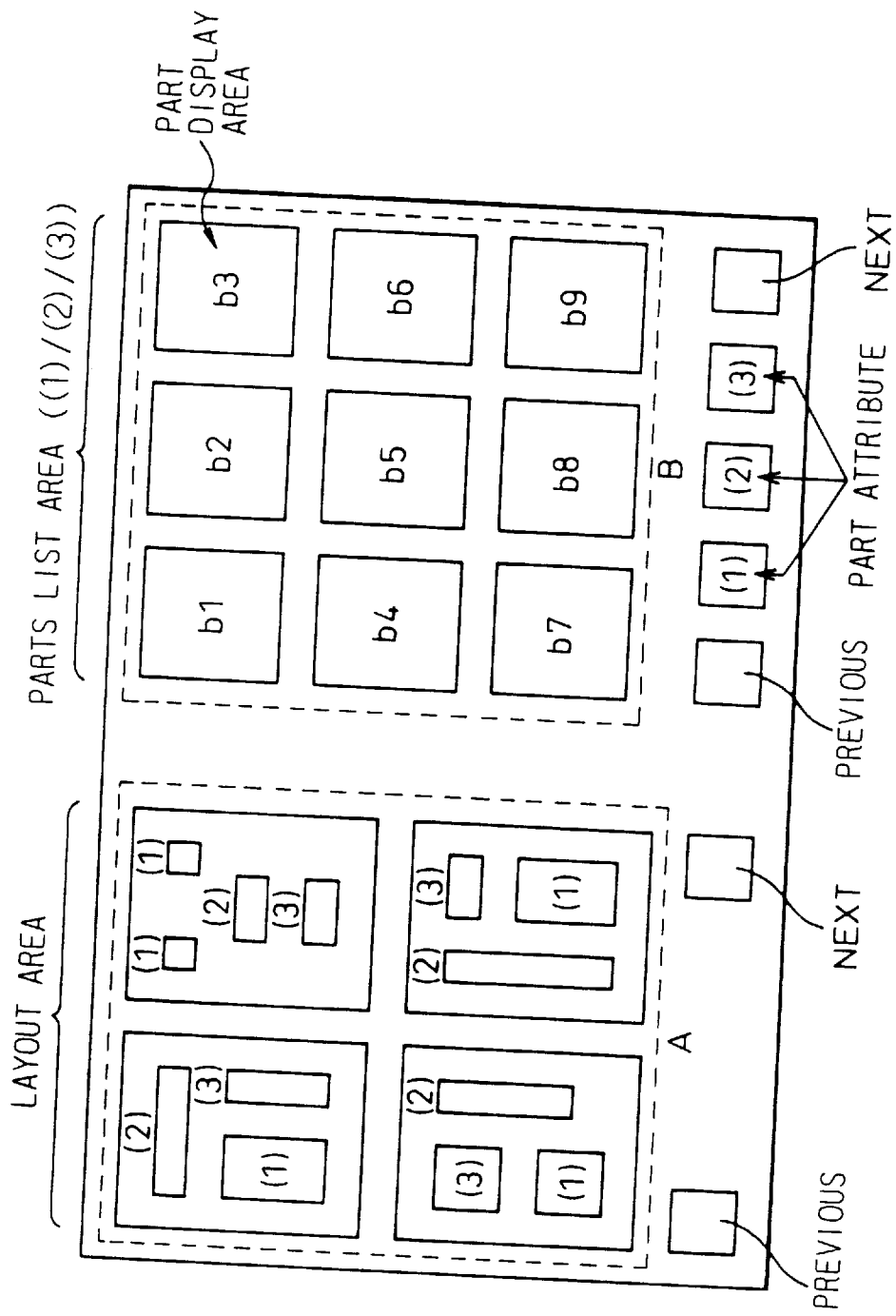
FIG. 5 is an explanatory diagram of a parts list switch screen in the embodiment.
Figure 6:
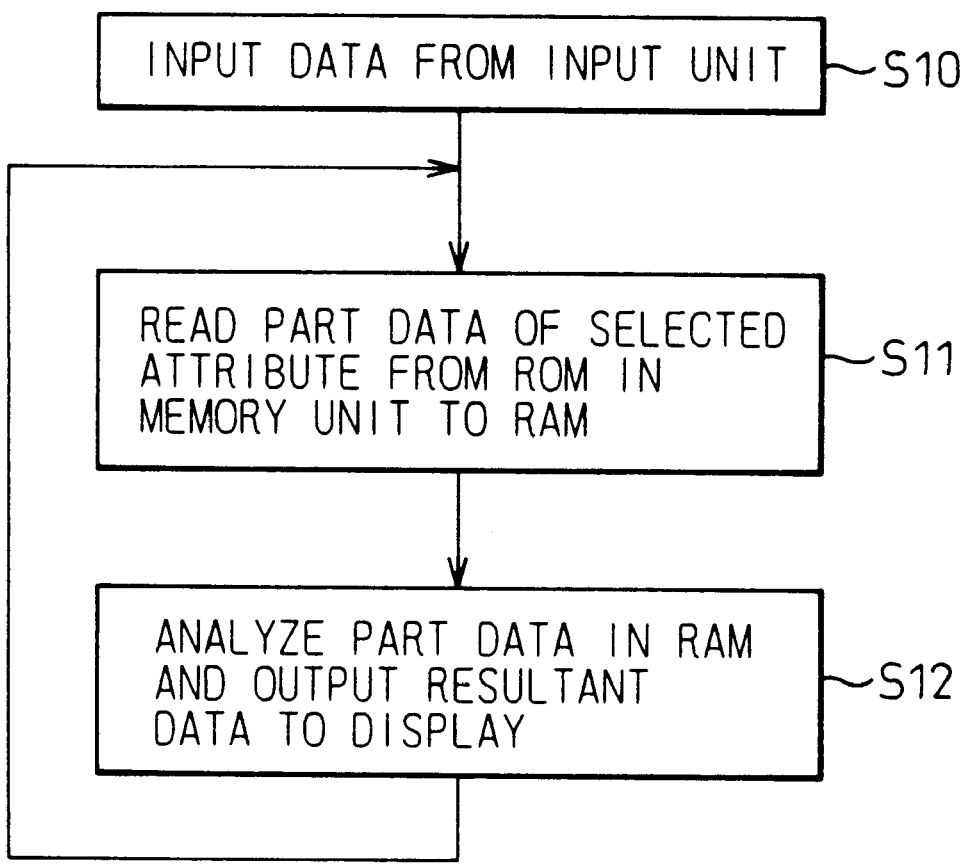
FIG. 6 is a flowchart describing parts list switch in the embodiment.

FIG. 5 is an explanatory diagram of a parts list switch screen, and FIG. 6 is a flowchart describing parts list switch. Parts list switch will be described in conjunction with FIGS. 5 and 6, where S10 to S12 denote processing steps.

When any of part attributes (1) (illustration), (2) (title), and (3) (text) is selected in the layout/parts list screen shown in FIG. 3, a parts list switch screen shown in FIG. 5 appears. In this screen, the contents of display of the layout area will not be changed with selection of a part attribute.

In the initial screen, part attribute (1) (illustration) is selected is a part attribute. Different parts (1)-1 to (1)-9 having the part attribute (1) are displayed in all the part display areas b7, b2, etc., and b9 in the parts list area.

In the initial screen, when, for example, part attribute (2) (title) is selected by pressing the Part Attribute (2) key, the display of a list of parts is switched to another display. Different parts (2)-1 to (2)-9 having the part attribute (2) are then displayed in all of the part display areas b1, b2, etc., and b9 in the parts list area.

When part attribute (3) (text such as greetings) is selected by pressing the Part Attribute (3) key, the display of a list of parts is switched to another display. Different parts (3)-1 to (3)-9 having the part attribute (3) are then displayed in all of the part display areas b1, b2, etc., and b9 in the part; list area.

Thus, a list of parts can be switched by manipulating the Part Attribute (1) key, Part Attribute (2) key, or Part Attribute (3) key. In this case, when the Next key displayed in the parts list area is pressed, a list of parts in a subsequent page appears. Even in the subsequent page, the part attribute can be switched to another part attribute. Likewise, in a previous page displayed by manipulating the Previous key, a part attribute can be switched to another part attribute.

Parts list switch is carried out as described below under the control of the CPU 14 (See FIG. 6). First, when information concerning selection of the any of part attributes (1), (2), and (3) is input from the input unit 11 (for example, a touch-sensitive panel) through operator's manipulation (S10) the CPU 14 reads part data of the selected attribute from the part data stored in the ROM 16 in the memory unit 15 on the basis of the selection information, and stores the data in the RAM 17 (S11).

The CPU 14 then reads and analyzes the part data stored in the RAM 17, and outputs the resultant data to the display 13 (S12). The CPU 14 repeats the processing of steps S11 and S12 by the number of parts that can be displayed in one screen. This, parts of the selected attribute are displayed successively in the parts list area of side B of the screen shown in FIG. 5.

Figure 7:
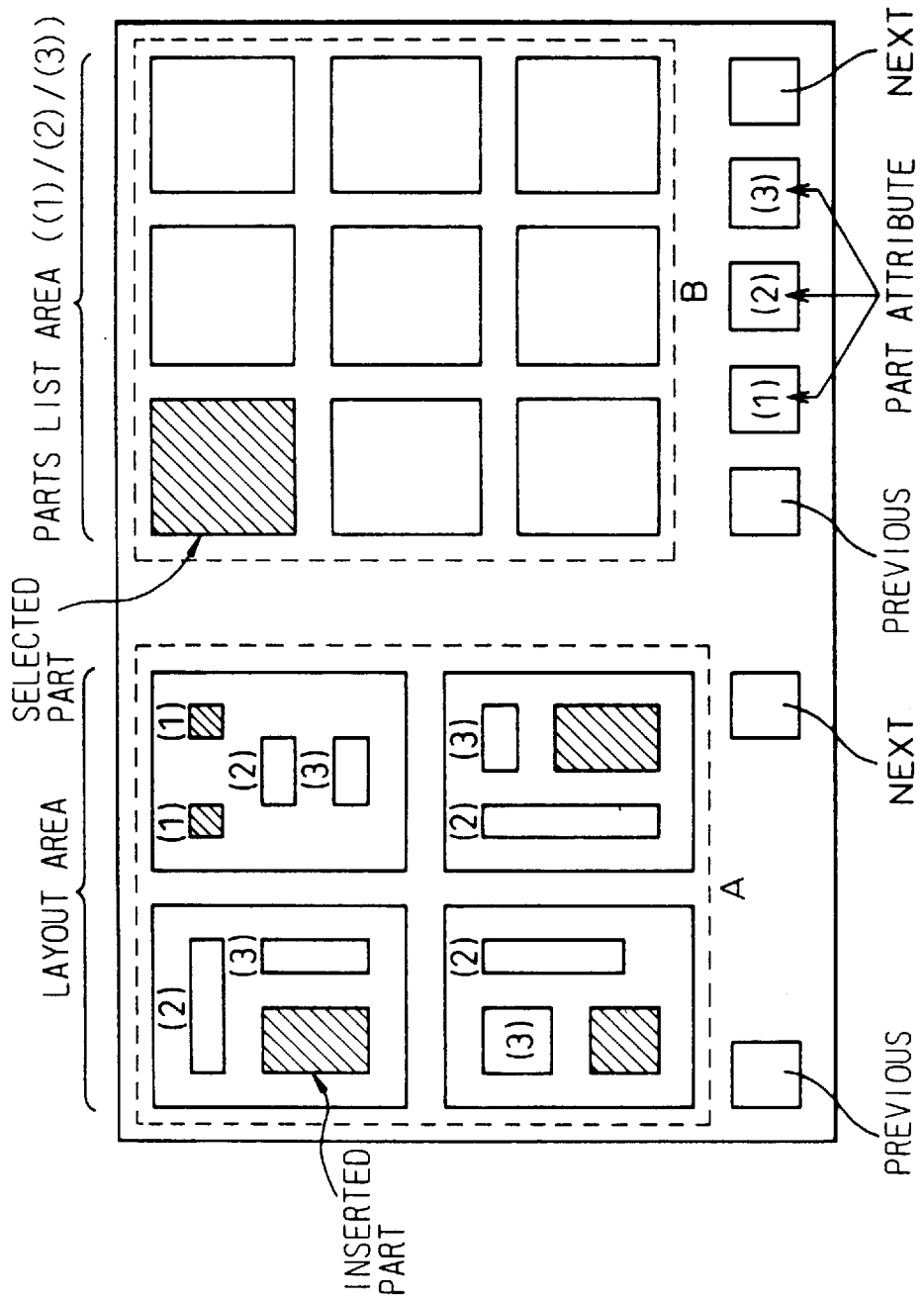
FIG. 7 is an explanatory diagram of a part insertion screen in the embodiment.
Figure 8:
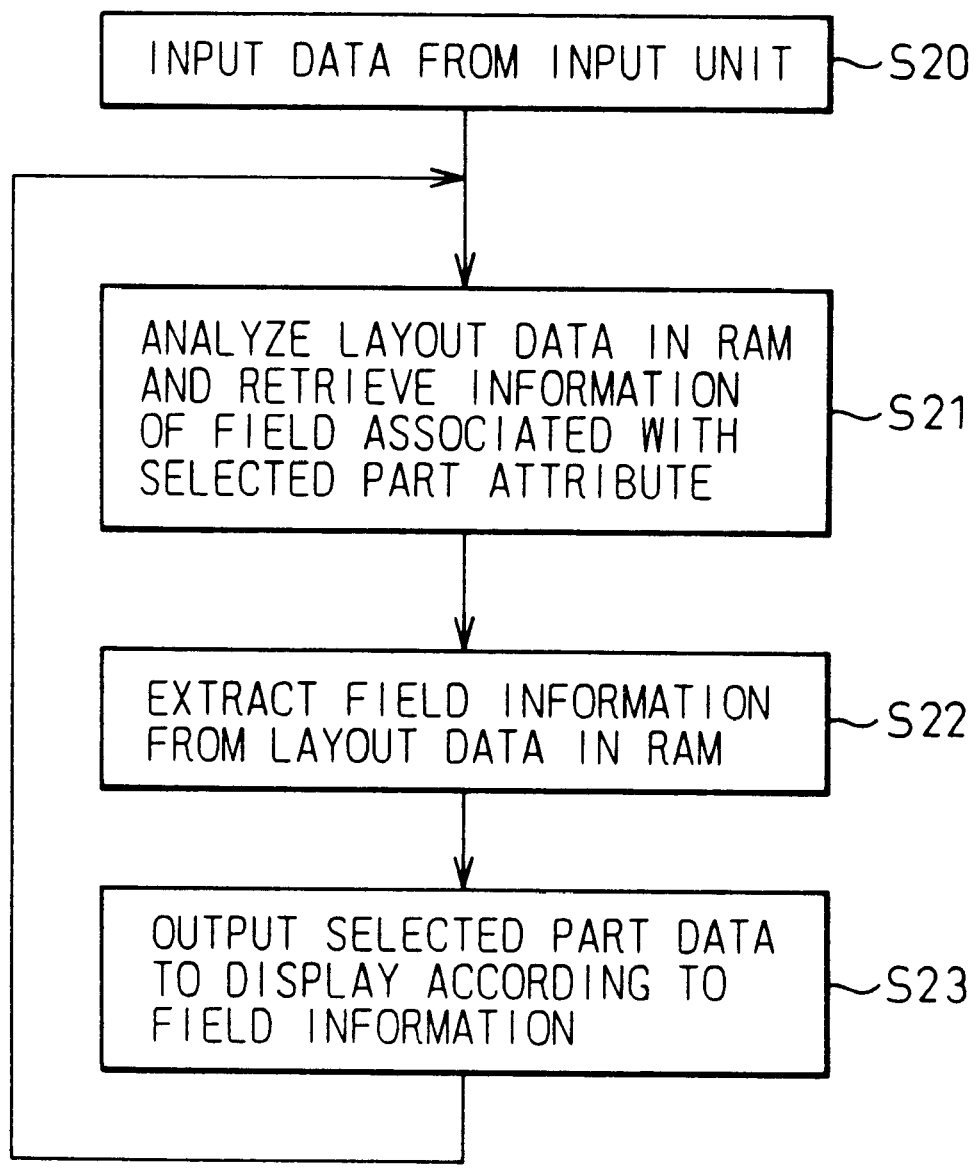
FIG. 8 is a flowchart describing part insertion in the embodiment.

FIG. 7 is an explanatory diagram of a part insertion screen, and FIG. 8 is a flowchart describing part insertion. Part insertion will be described below in conjunction with FIGS. 7 and 8, where S20 to S23 denote processing steps.

After parts are displayed by selecting any part attribute in the parts list switch screen shown in FIG. 5, when any part is selected from a list of parts, the selected part is inserted into an associated field or associated fields in each layout displayed in the layout area.

To be more specific, when one part (shaded portion in FIG. 7) is selected from all the parts shown in the parts list area in the part insertion screen, the selected part is inserted into an associated field (part insertion area) or associated fields in each layout displayed in the layout area (in FIG. 7, a shaded portion in the parts list area corresponds to the selected part, and a shaded portion or shaded portions of each layout in the layout area correspond to the inserted part).

For example, when any one part (illustration) is selected with parts of part attribute (1) (illustration) displayed in the parts list area, the part is inserted into an associated field (field associated with part attribute (1)) (or associated fields) in each layout displayed in the layout area.

Part insertion is carried out as described below under the control of the CPU 14 according to operator's manipulation (See FIG. 8). After one part (for example, part (1)-1) is selected at the input unit 11 through operator's manipulation with parts having any attribute displayed in the parts list switch screen shown in FIG. 5, when the selection information is input (S20), the CPU 14 reads and analyzes layout data stored in the RAM 17. The CPU 14 then retrievers information of an associated field (a field associated with attribute (1)) (or associated fields) in each layout displayed in the layout area (S21).

Thereafter, the CPU 14 extracts the information of the associated field (or associated fields) in each layout from the layout data stored in the RAM 17 (S22). The information is information such as a position to which a part is output and a size of the field (See FIG. 2B). The CPU 14 then outputs the selected part data (data of part (1)-1) from the RAM 17 to the display 13 according to field information (S23).

The CPU 14 repeats the Processing of steps S21, S22, and S23 by the number of layouts displayed in one screen. This processing causes the display 13 to display the inserted part in the layout area of side A.

By repeating parts list switch and part insertion through operator's manipulation, parts having any part attributes can be inserted into all associated fields in each layout displayed in the layout area.

Figure 9:
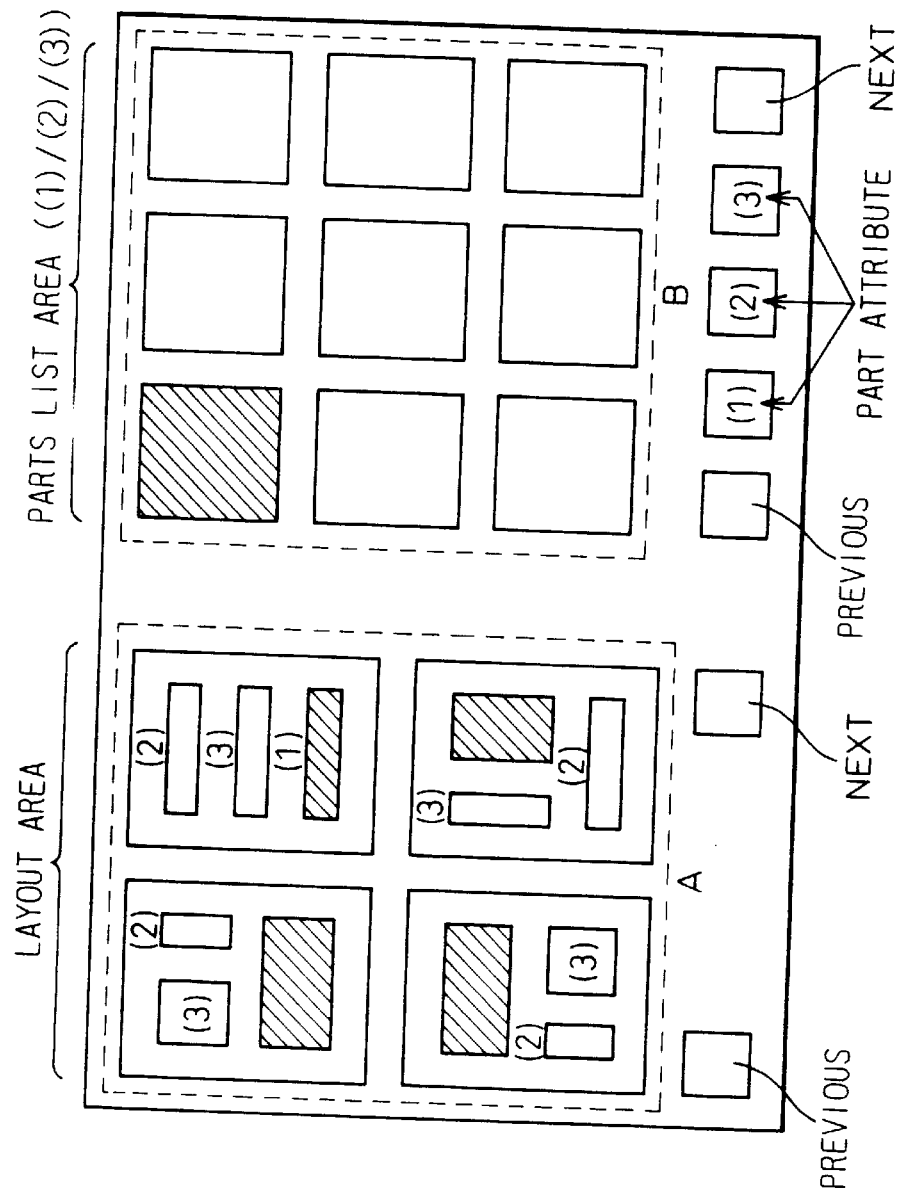
FIG. 9 is an explanatory diagram of a layout switch screen in the embodiment.
Figure 10:
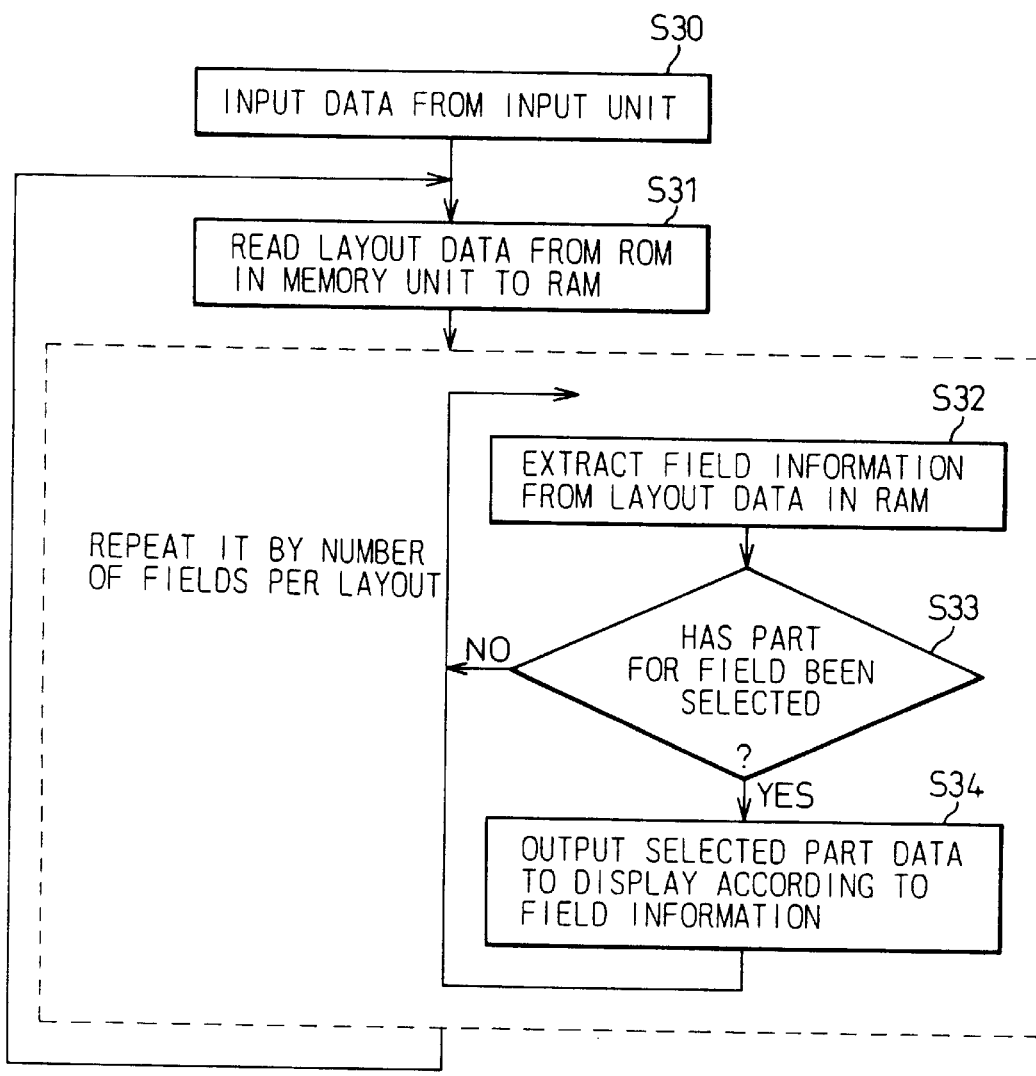
FIG. 10 is a flowchart describing layout switch in the embodiment.

FIG. 9 is an explanatory diagram of a layout switch screen, and FIG. 10 is a flowchart describing layout switch. Layout switch will be described in conjunction with FIGS. 9 and 10.

With a part inserted into an associated field (or associated fields) in each layout in the part insertion screen shown in FIG. 7, when the layouts are switched by pressing the Next key (key on the touchsensitive panel) displayed in the layout area, layouts in a subsequent page appear as shown in FIG. 9. In this case, the same part as that in a previous page (selected part) is inserted into the associated field in each layout.

When the Next key displayed in the layout area is pressed again with the screen shown in FIG. 9 displayed, layouts in a subsequent page appear. Even in this case, the selected part is inserted into an associated field (or associated fields) in each layout in the subsequent page. When the Previous key displayed in the layout area is pressed, layouts in a previous page appear.

Thus, when layouts to be displayed in the layout area occupy a plurality of pages, a selected part is inserted into the layouts in the other page to which a page is switched by manipulating the Next key or Previous key. Even when a page of layouts is switched to another page, the layouts are displayed with a selected part inserted into an associated field (or associated fields) in each of the layouts. An operator can see layouts in any page with a part inserted into an associated field (or associated fields) in each of the layouts, merely by manipulating the Next key or Previous key.

The processing in the layout switch screen is carried out as described below under the control of the CPU 14 (See FIG. 10). First, after the Next key (key on the touch-sensitive panel) displayed in the layout area is pressed, when information of selection of a subsequent page is input from the input unit 11 (touch-sensitive panel) (S30), the CPU 14 reads layout data from the ROM 16 and stores the data in the RAM 17 (S31).

Thereafter, the CPU 14 extracts information of a field from the layout data stored in the RAM 17 (S32). The CPU 14 then judges whether or not a part to be inserted into the field has been selected (S33). If the part to be inserted into the field has not been selected, information of a subsequent field is extracted from the layout data stored in the RAM 17 (S32).

If the part to be inserted into the field has been selected, data of the selected part is output to the display 13 according to field information (S34). The processing of steps S33 and S34 is thus repeated by the number of fields per layout. When the processing terminates, control is returned to the processing of step S31.

The processing of steps S31 to S34, or layout display, is then repeated by the number of layouts that can be displayed in one screen (one page). Thus, layouts displayed in the layout area of side A are switched to other layouts.

Figure 11:
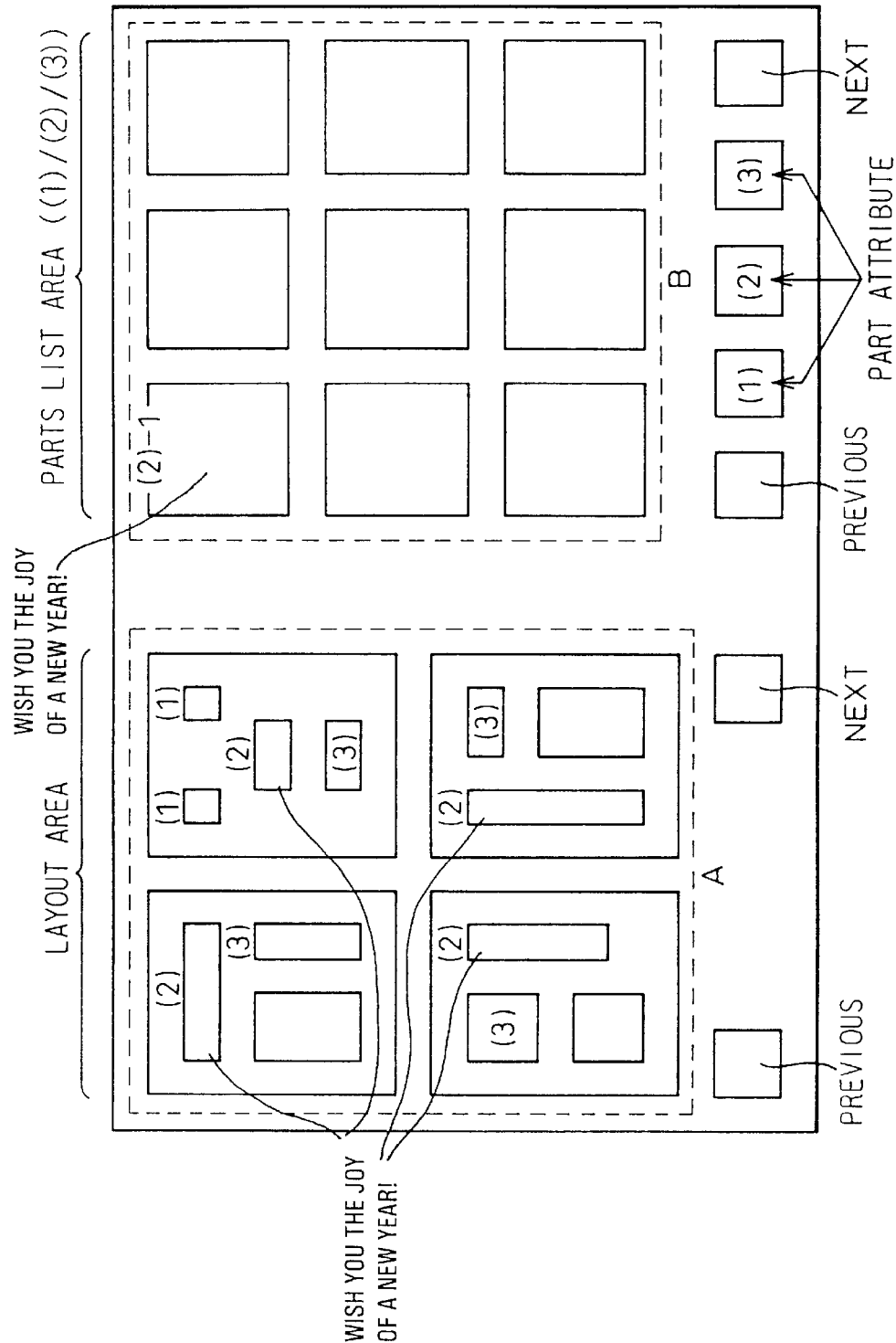
FIG. 11 is an explanatory diagram of a vertically/laterally-written part insertion screen in the embodiment.
Figure 12:
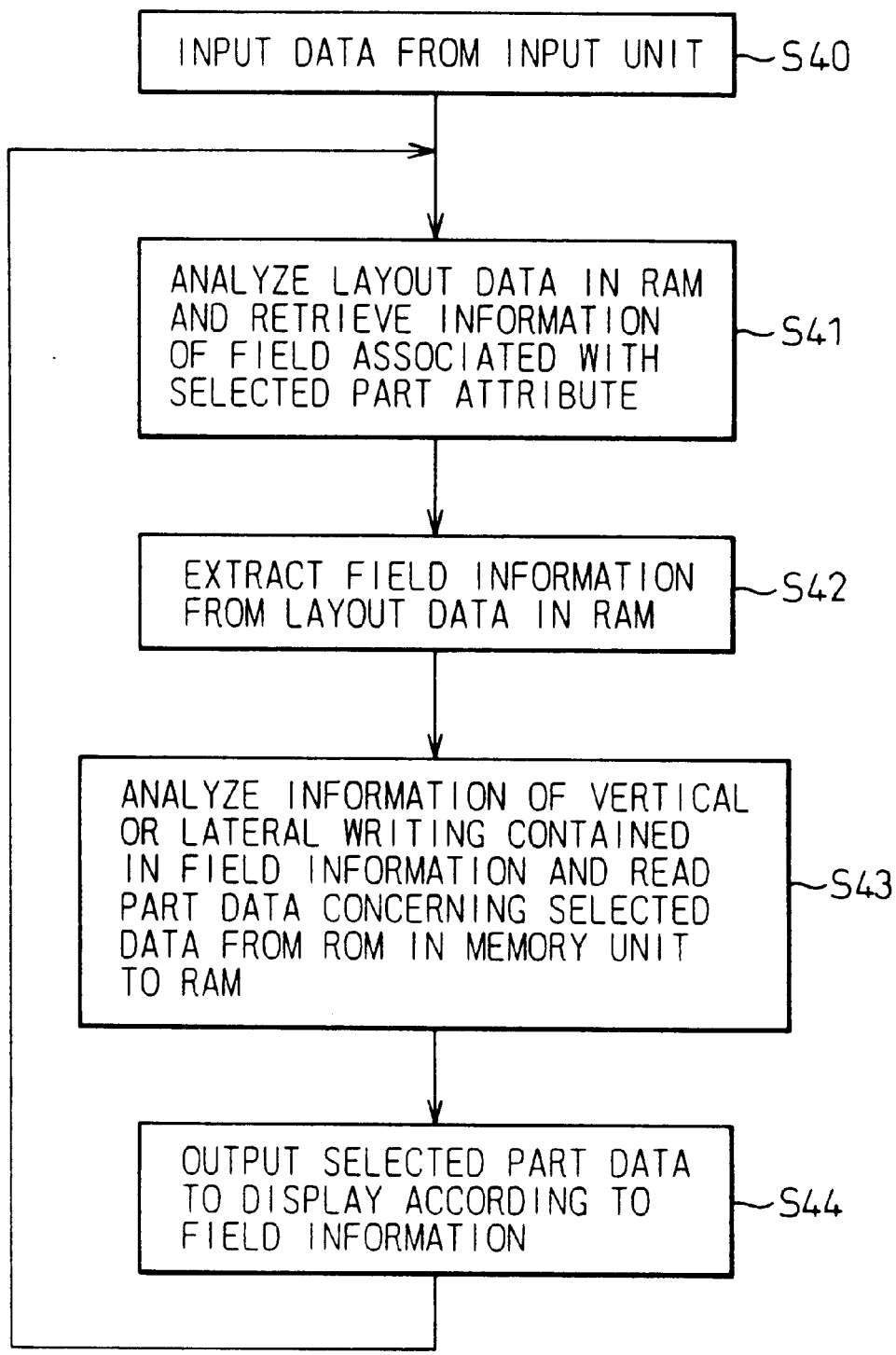
FIG. 12 is a flowchart describing vertically/laterally-written part insertion in the embodiment.

FIG. 11 is an explanatory diagram of a vertically-written/laterally-written part insertion screen, and FIG. 12 is a flowchart of vertically-written/laterally-written part insertion. Vertically-written/laterally-written part insertion dependent on modification information contained in layout data will be described in conjunction with FIGS. 11 and 12, S40 to S44 denote processing steps.

A screen in which vertically-written or laterally-written parts are inserted according to modification information contained in layout data is as shown in FIG. 11. For displaying this screen, modification information contained in data stored in the ROM 16 is employed. In this case, the modification information includes information specifying whether parts to be inserted into fields in each layout should be written vertically or laterally.

For inserting a part into an associated field in each layout, if vertical writing is specified for the field, a vertically-written part is inserted. If lateral writing is specified, a laterally-written part is inserted. An example in which, for example, when part attribute (2) (title) is selected, modification of vertical writing or lateral writing is performed on a part of part attribute (2) (title) will be described.

Assume that part attribute (2) is selected in the parts list area, and that, for example, part (2)-1 (laterally-written Japanese word) is selected as one specific part from a list of parts with parts of the selected part attribute displayed. In this case, the selected part (2)-1 is supposed to be inserted into layouts in the layout area. Since the selected part (2)-1 is a laterally-written Japanese word, if a field in a layout to which the part is to be inserted is a lateral writing field, the selected part (2)-1 can be inserted as it is. However, if the field is a vertical writing field, the selected part (2)-1 cannot be inserted as it is.

For inserting the part into a vertical writing field, the part that is a laterally-written Japanese word is corrected into a vertically-written part (edition of part data) and then inserted. Thus, although the number of parts to be selected in the parts list area is one, the selected part can be inserted into all associated fields in the layout area irrespective of whether the fields are vertical writing or lateral writing fields.

FIG. 11 shows a state in which part (2)-1 (laterally-written Japanese word) selected in the parts list area is inserted into an associated field (vertical writing or lateral writing field) in each layout displayed in the layout area according to modification information.

Vertically-written/laterally-written part insertion dependent on modification information contained in layout data is carried out as described below under the control of the CPU 14 (See FIG. 12). First, part (2)-1 (laterally-written Japanese word) is selected from a list of parts by manipulating the input unit 11 (in this example, a touch-sensitive panel). When the selection information is input (S40), the CPU 14 analyzes layout data stored in the RAM 17 and retrieves information of a field associated with the selected part attribute (field associated with part attribute (2)) (S41).

The CPU 14 then extracts field information from the layout data stored in the RAM 17 during the retrieval (S42). In this case, the CPU 14 obtains information such as a position to which the part is output and a size of a field, and modification information such as vertical or lateral writing. Thereafter, the CPU 14 analyzes the modification information of vertical or lateral writing contained in the field information, reads part data concerning the selected part from the ROM 16, and stores the part data in the RAM 17 (S43).

In this case, if a field associated with part attribute (2) is a field for which either vertical writing or lateral writing must be specified, a part to be inserted into the field is provided with part data for vertical writing and part data for lateral writing.

Thereafter, the CPU 14 reads selected part data from the RAM 17. For a part that should be modified, the part is modified according to field information (for example, vertical writing is converted into lateral writing), and then output to the display 13 (S44). Thus, the processing of steps S41 to S44 is repeated by the number of layouts displayed in one screen (one page).

Figure 13:
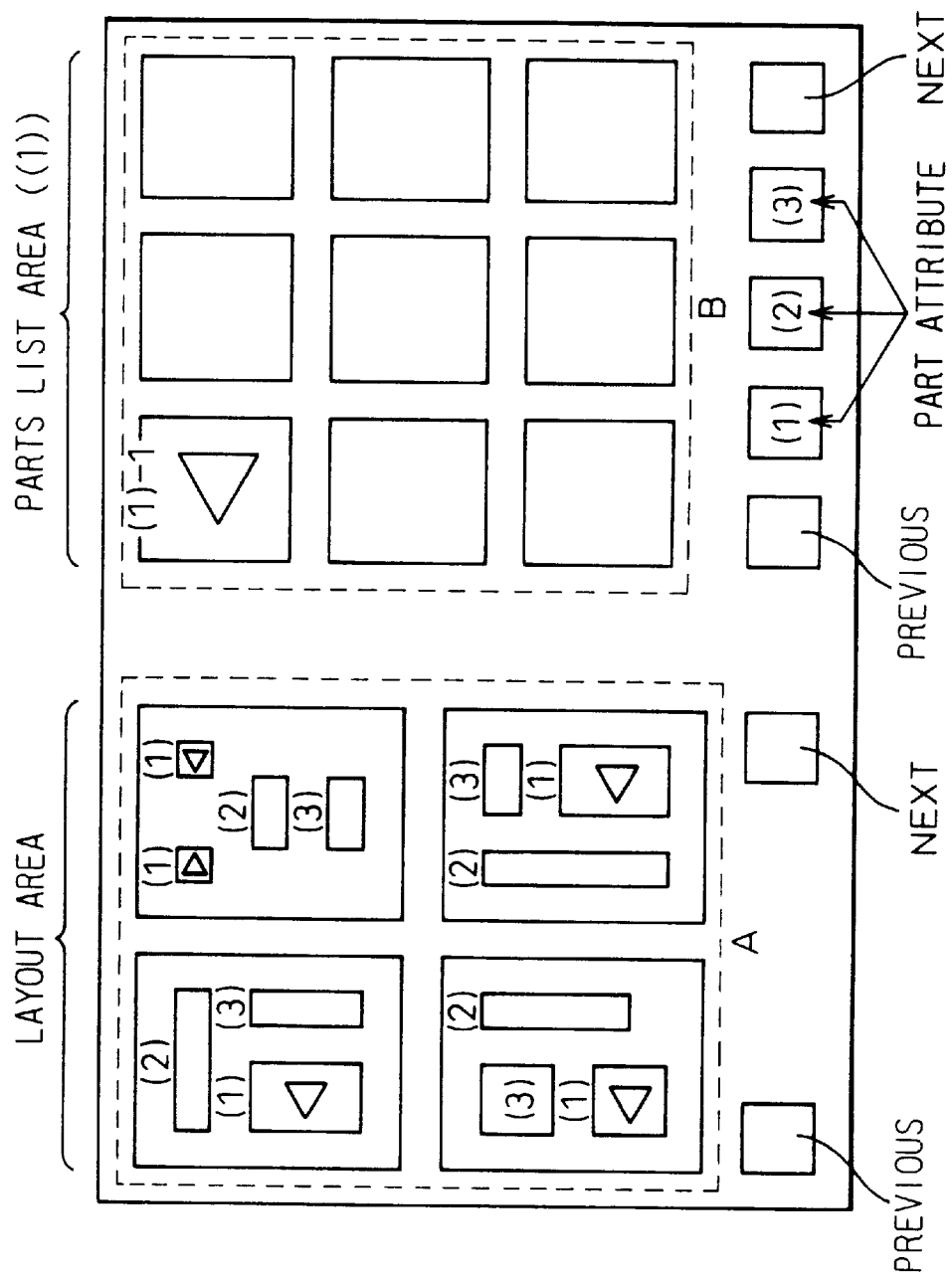
FIG. 13 is an explanatory diagram of a modified part insertion screen in the embodiment.
Figure 14:
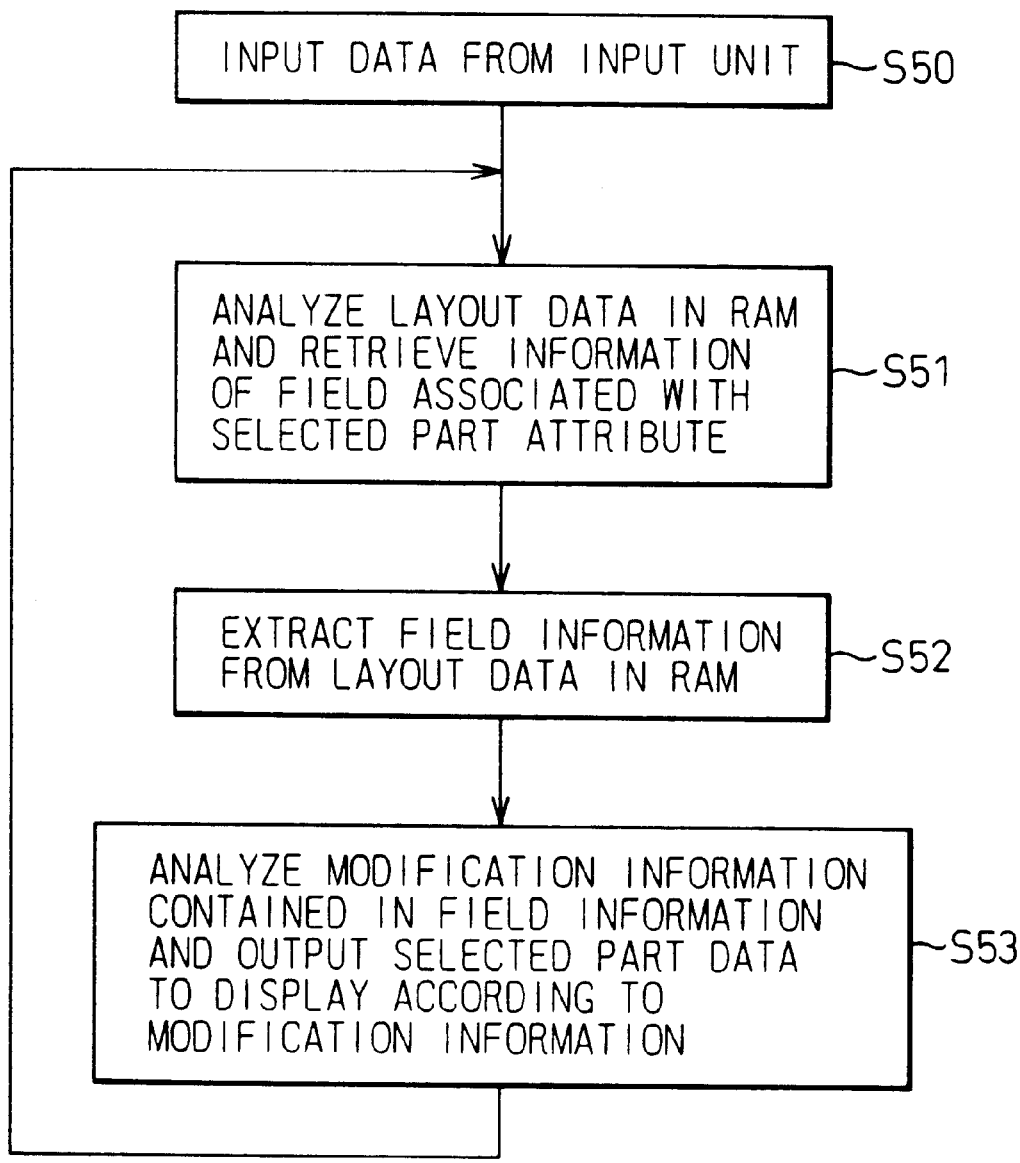
FIG. 14 is a flowchart describing modified part insertion in the embodiment

FIG. 13 is an explanatory diagram of a modified part insertion screen, and FIG. 14 is a flowchart describing modified part insertion. Processing for inserting a modified part into a field in a layout (for example, lateral reversal) will be described in conjunction with FIGS. 13 and 14, where S50 to S53 denote processing steps.

When one part is selected from a list of parts in a modified part insertion mode, a screen appears as shown in FIG. 13 with the modified part inserted into an associated field in all layouts.

For example, when part (1)-1 is selected from a list of parts containing parts of part attribute (1), data of the selected part (1)-1 and data of laterally-reversed part (1)-1 are displayed as paired parts in a field, into which the part (1)-1 is supposed to be inserted in pairs, among the fields in all layouts. Into a field into which part (1)-1 is supposed to be solely inserted, the selected part (1)-1 is inserted as it is.

Even in this case, when the layout area occupies a plurality of pages, every time layouts are switched to other layouts, part (1)-1 alone or paired parts of the part (1)-1 and reversed part (1)-1 are inserted into an associated field or associated fields in each layout in all pages.

The modified part insertion screen is realized by modifying a part selected from a list of parts according to information such as lateral reversal, vertical reversal, or rotation by any angle out of modification information contained in layout data, and inserting the modified part (for example, a vertically or laterally-reversed part) into an associated field.

In the modified part insertion mode, insertion of a modified part is carried out as described below under the control of the CPU 14 (See FIG. 14). Part (1)-1 is selected from a list of parts by manipulating the input unit 11 (in this example, a touch-sensitive panel). When the selection information is input (S50), the CPU 14 reads layout data from the RAM 17, analyzes it, and retrieves information of a field associated with the part attribute of the selected part (1)-1, that is, part attribute (1) (S51).

The CPU 14 then extracts field information from layout data in the RAM 17 (S52). The CPU 14 then analyzes modification information contained in the field information, and outputs part data of the selected part (modified part) to the display 13 according to the modification information (modification information such as lateral reversal) (S53).

In the above processing, if the modification information for a field into which the part is inserted is modification information of lateral reversal, the part is laterally reversed, and the resultant part data is output to the display 13. As mentioned above, the processing of steps S51 to S53 is repeated by the number of layouts displayed in one screen (one page).

With the foregoing processing, once one part is selected from a list of parts, not only the selected part but also a part made by modifying the selected part (for example, a part made by laterally reversing the selected part) can be inserted simultaneously into fields in a layout. This kind of modified part insertion is intended to realize a varied layout or well-balanced layout through simple manipulation.

The processing in a particular example will be described in conjunction with FIGS. 15 to 23.

Figure 15:
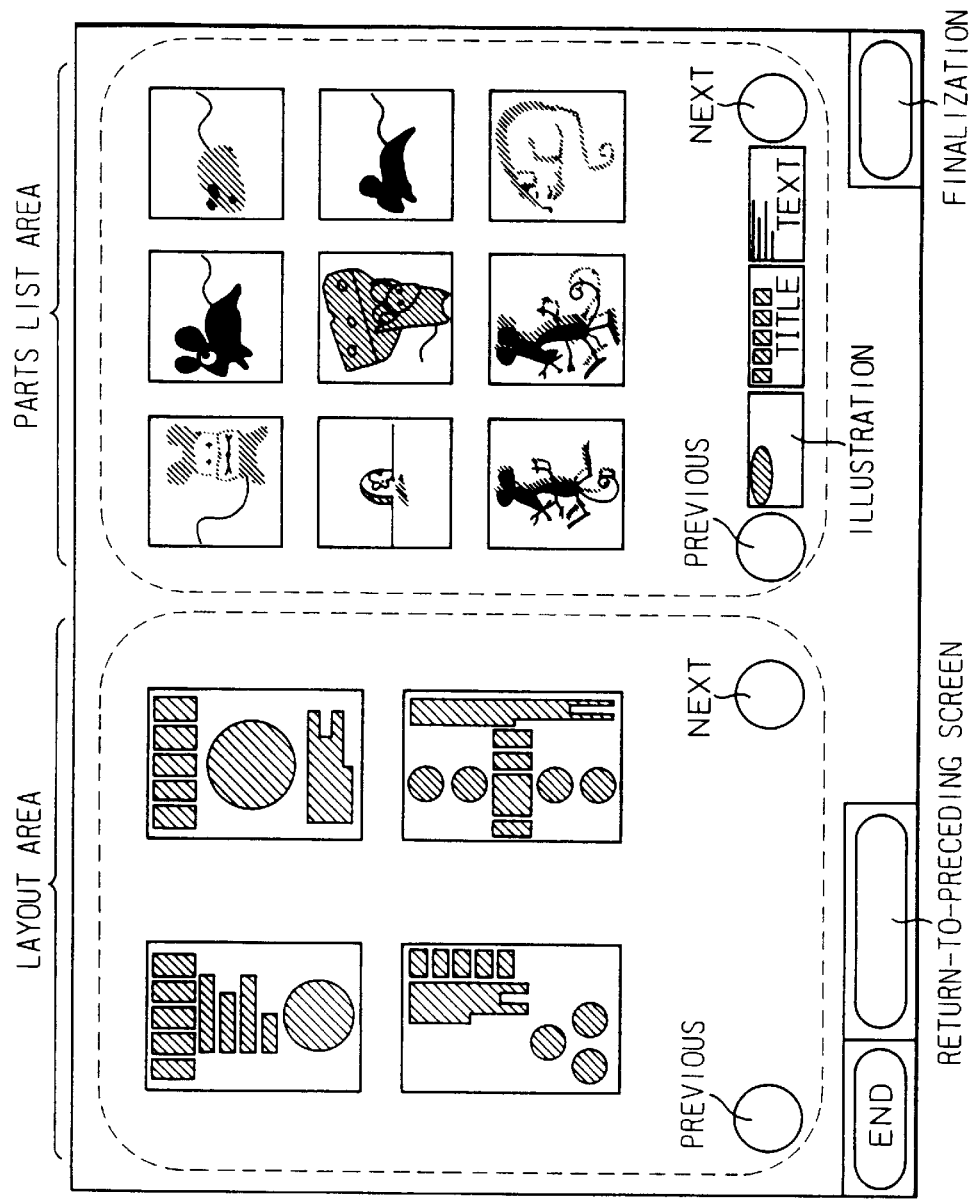
FIG. 15 shows an example of the layout/parts list screen in the embodiment.

FIG. 15 shows an example of a layout/parts list screen. The example shown in FIG. 15 is an example of the layout/parts list screen shown in FIG. 3. Illustrations of part attribute (1) are displayed in the parts list area in an initial screen for Illustration New Year's Card selected from the menu. In this case, the illustrations of part attribute (1) express a mouse that is one of twelve zodiacal signs. A plurality of illustrations of a mouse are displayed.

Even when the page of the list of parts is turned, illustrations of the mouse appear in all pages. For example, when the Next key (key of the touch-sensitive panel) displayed in the parts list area in the screen shown in FIG. 15 is pressed, illustrations of a mouse appear as a list of parts in a subsequent page.

In the main unit 10, the clock 18 for indicating a current date is incorporated. When reading part data to be displayed in the parts list area in an initial screen from the ROM 16, the CPU 14 recognizes the sign of the next year on the basis of the information of a current date indicated by the clock. The CPU 14 then reads data from a position in the ROM 16 at which part data of the sign is stored, and displays the data in the parts list area. Incidentally, the twelve zodiacal signs are changed around, for example, February every year.

In the layout area, layouts (layouts of a New Year's card) each made by combining fields associated with part attribute (1) (illustration), part attribute (2) (title), and part attribute (3) (text) are displayed (with no part inserted). The layouts occupy, for example, a plurality of pages. Layouts of any page can be displayed by manipulating the Next key and Previous key displayed in the layout area.

Figure 16:
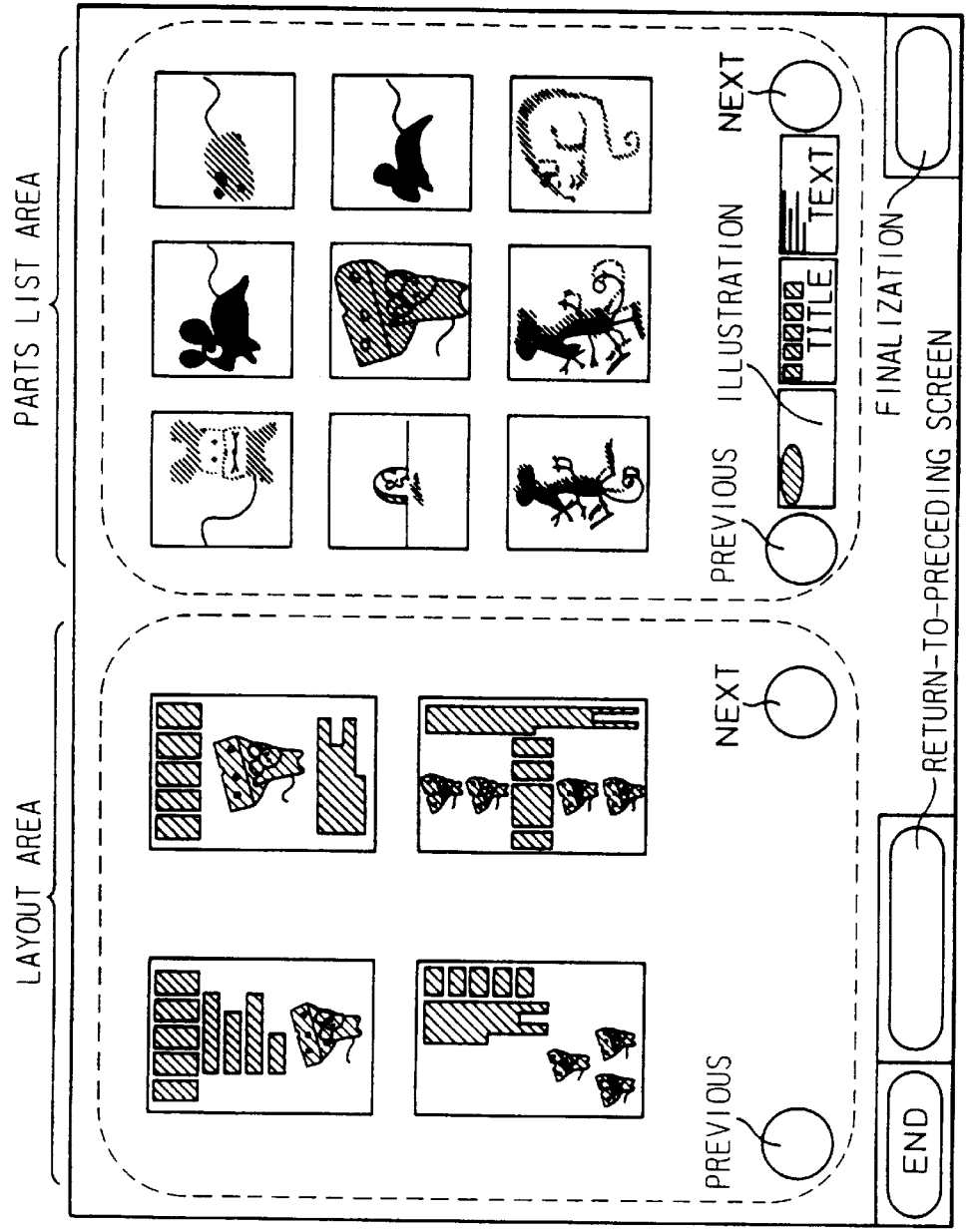
FIG. 16 shows an example of a part insertion screen in the embodiment.

FIG. 16 shows an example of a part insertion screen. For example, when one illustration is selected from among the illustrations of a mouse displayed as a list of parts in the parts list area in the screen shown in FIG. 15, the selected illustration of a mouse is inserted into an associated field in each layout displayed in the layout area.

Specifically, when one illustration of a mouse is selected from a list of parts, the illustration of a mouse is inserted into an associated field in each layout. When the Next key displayed in the layout area is pressed, the illustration of a mouse is inserted to an associated field in each layouts in a subsequent page.

In the same manner as mentioned above, when one part is selected with the parts of part attribute (3) displayed in the parts list area, the selected part (one part of part attribute (3)) is inserted into an associated field in each layout displayed in the layout area.

Figure 17:
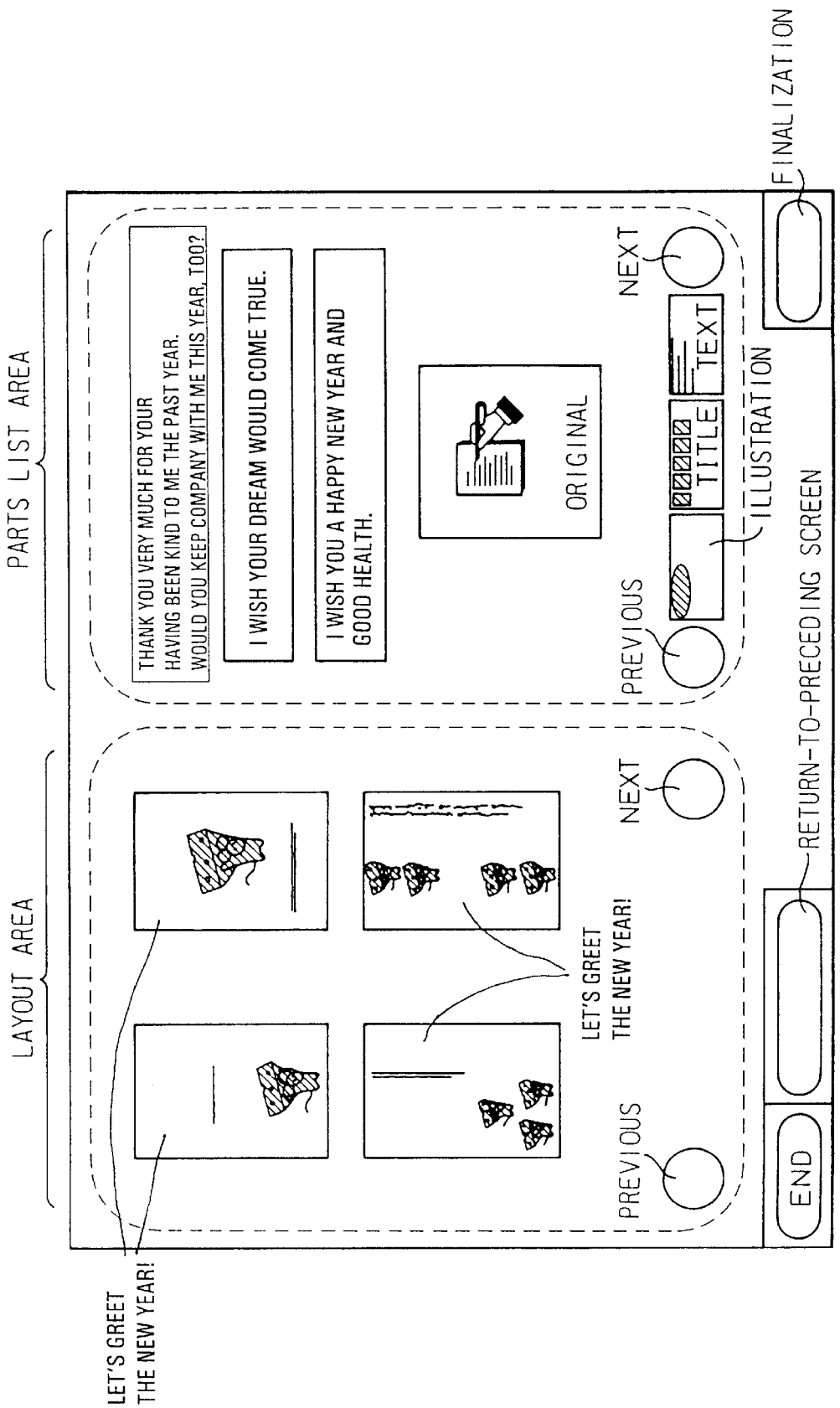
FIG. 17 shows an example of an original documentation support facility display screen in the embodiment.

FIG. 17 shows an example of an original documentation support facility display screen. As mentioned above, parts of part attributes (1), (2), and (3) can be changed and displayed in the parts list area. In this case, when part attribute (3) (text) is selected, various kinds of texts (text of a New Year's card) are displayed in the parts list area. An "Original" key (key of the touch-sensitive panel) is displayed in the last page.

The Original key is a key used to designate an original documentation support facility for supporting creation of an original document in order to insert an original document other than the stereotyped texts prepared in advance as a part of part attribute (3) into layouts.

For inserting an original document as a text into a field in each layout, the original key is pressed to create an original document. The original document is inserted into each field in the layout area. The original documentation support facility itself is a "documentation support facility" employed in a known apparatus.

FIG. 17 shows a state in which parts of part attribute (1) (illustration), part attribute (2) (title), and part attribute (3) (text) have been selected in the parts list area, and the selected parts are inserted into fields in each layout in the layout area.

Figure 18:
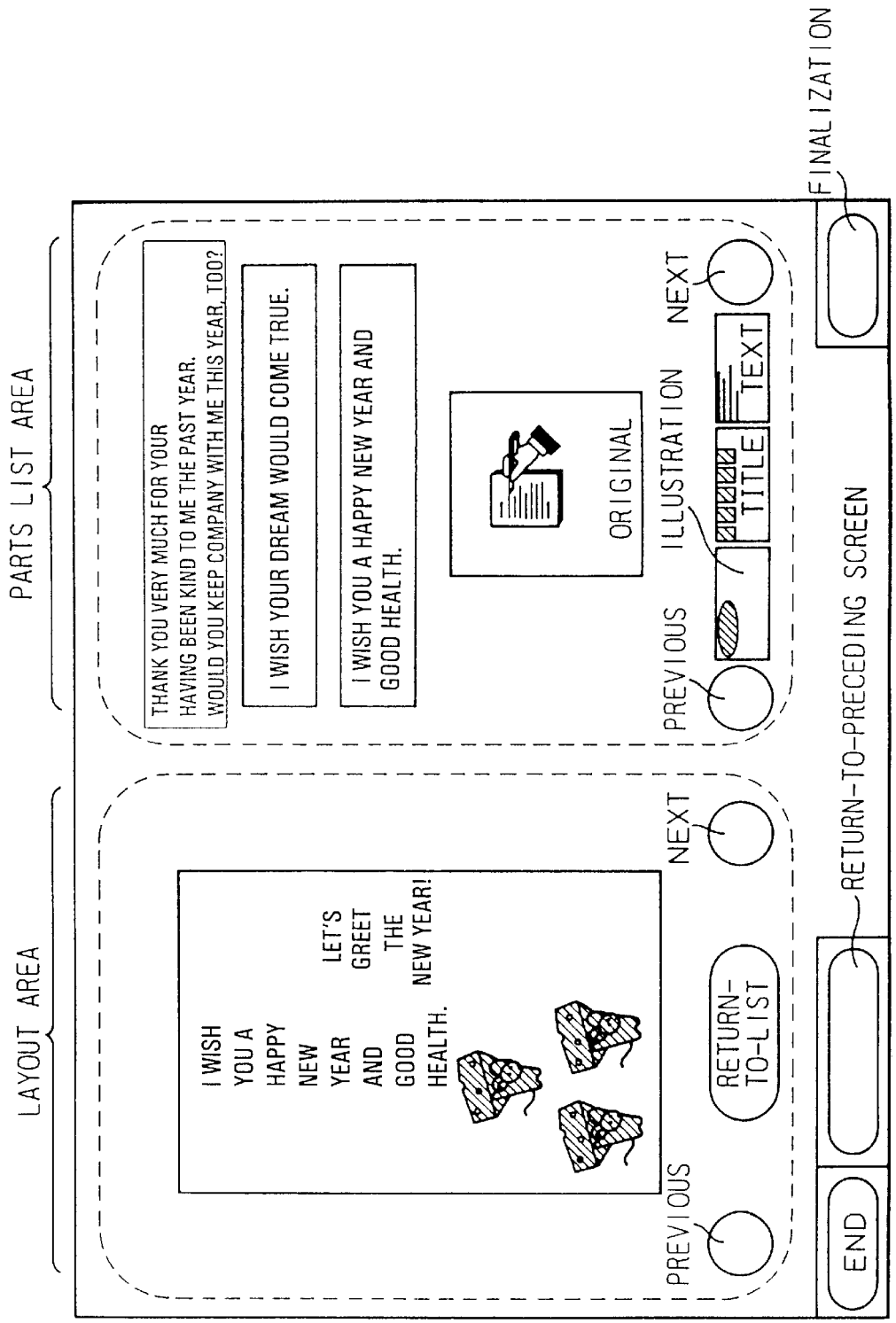
FIG. 18 shows an example of a partly enlarged screen in the embodiment.

FIG. 18 shows an example of a partly enlarged screen. When any of the layouts in the layout area is designated to be enlarged (designated using the input unit 11) in the screen shown in FIG. 17, the designated layout alone is, as shown in FIG. 18, displayed in enlarged form. Using this facility, any one layout alone can be enlarged and displayed with parts of part attributes (1), (2), and (3) inserted into all fields in the layout. An operator will find it easy-to-see.

Figure 19:
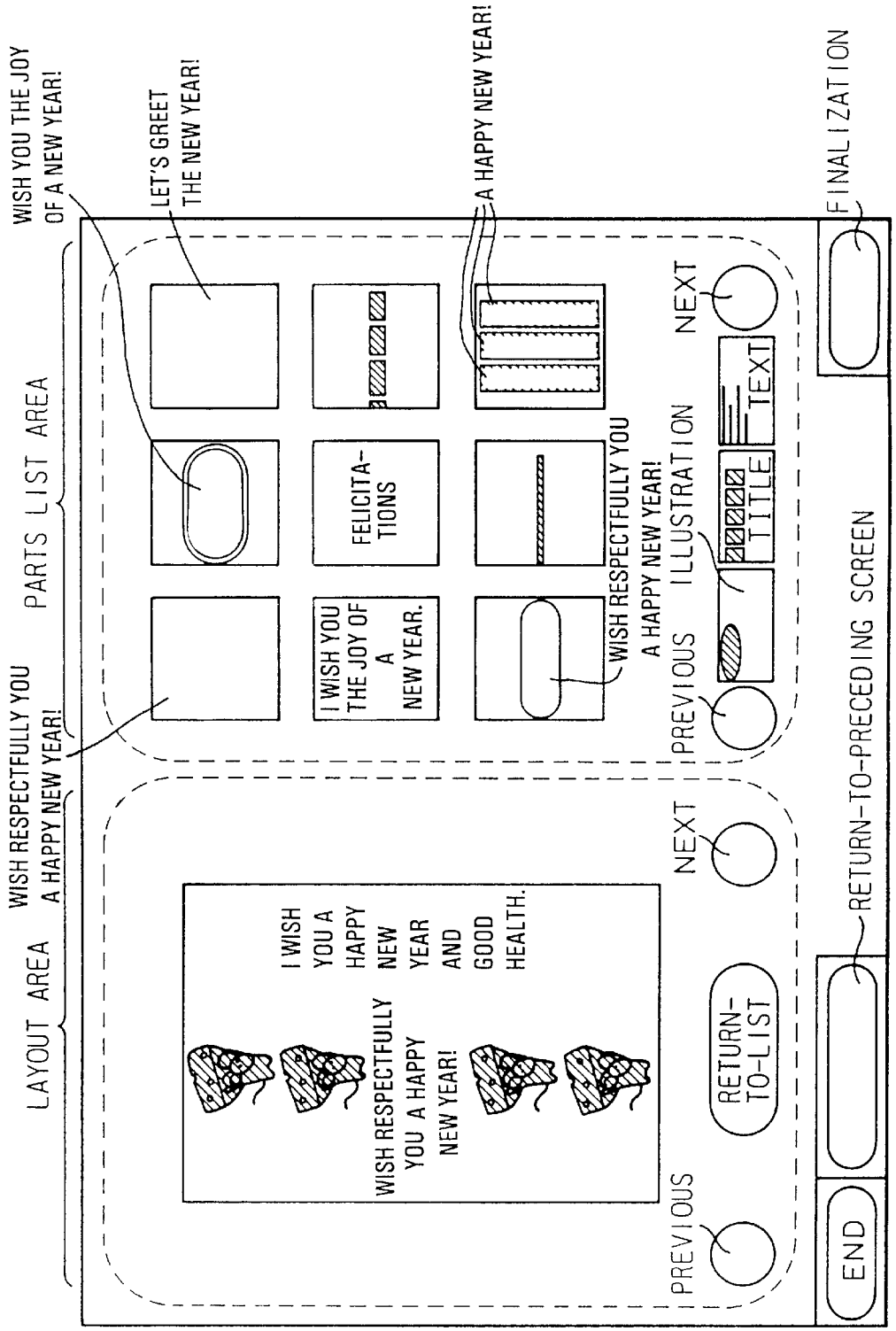
FIG. 19 shows an example of a part change screen in the embodiment.

FIG. 19 shows an example of a part change screen. When any of the parts in a layout displayed in enlarged form in the layout area should be changed to other parts, an intended one of the parts displayed in the parts list area is simply selected. A part in each field in the layout area can be freely changed to another.

In this screen, when any of Part Attribute (1) (illustration), Part Attribute (2) (title), and Part Attribute (3) (text) displayed in the parts list area is selected, the display of the parts list area is changed to another display according to the selection. When any of parts displayed in the parts list area is selected, the part is inserted into a field or fields in each layout in the layout area, and any of the layouts is enlarged and displayed. In this case, when a "Return-to-list" key displayed in the layout area is pressed, the enlarged display is returned to the original display of listing layouts.

Figure 20:
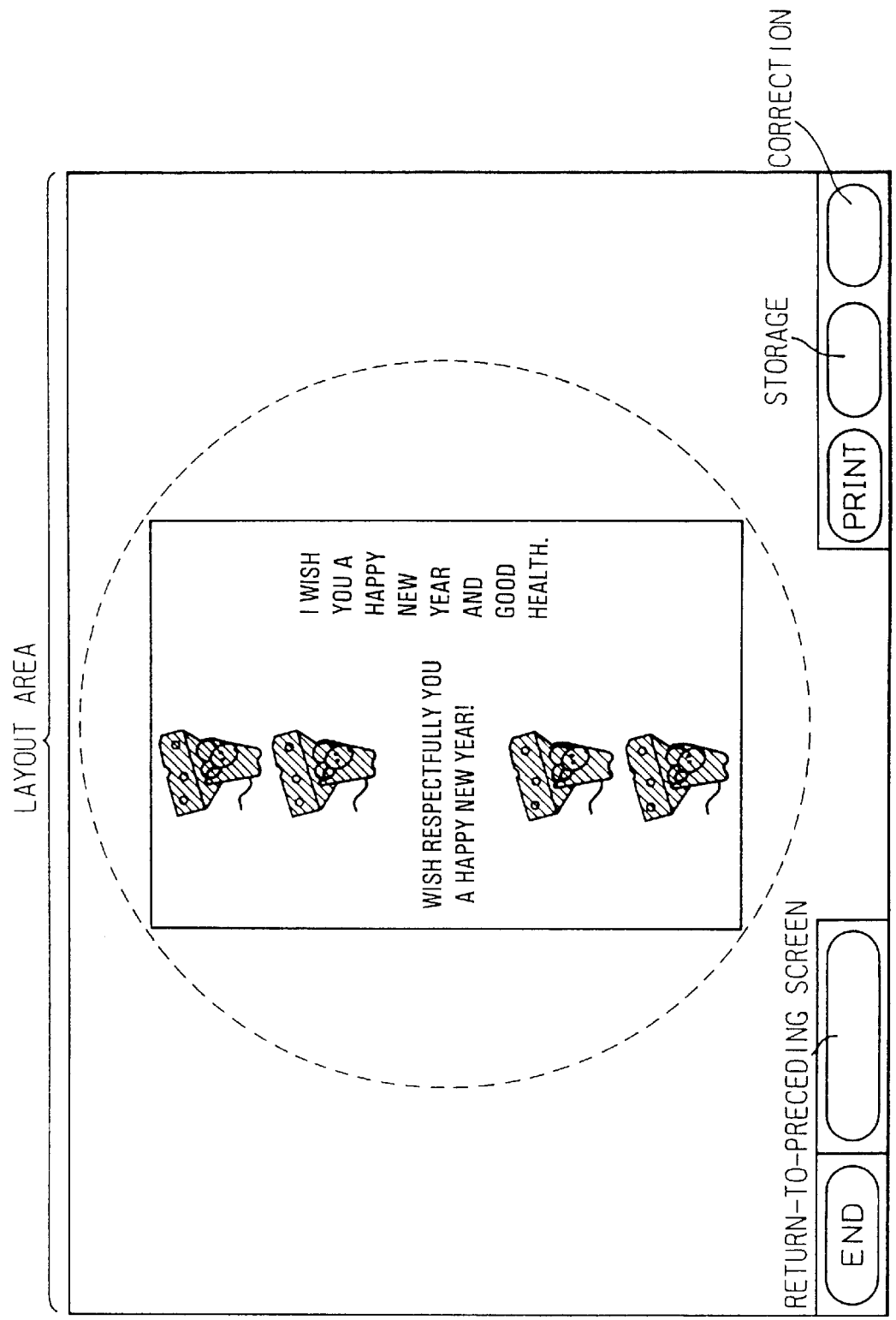
FIG. 20 shows an example of a finalization screen in the embodiment.

FIG. 20 shows an example of a finalization screen. As mentioned above, all parts (illustration, title, and text) are inserted into all fields in each layout, any of the parts is changed to another one, and finally document data of a New Year's card (New Year's card data) is produced. When judging that New Year's card data has been produced in the screen shown in FIG. 19, an operator presses a "Finalization" key (key of the touch-sensitive panel) displayed in this screen. When the Finalization key is pressed, a finalization screen shown in FIG. 20 appears. The New Year's card data is finalized in the RAM 17.

When New Year's card data is thus finalized in the RAM 17, unlike the data in the prior art, the data need not be saved in a flexible disk, hard disk, or the like but can be output from the RAM 17 directly to a printer or the like. In this case, after New Year's card data is finalized through operator's manipulation, when a "Print" key displayed in the screen shown in FIG. 20 is pressed, the CPU 14 immediately outputs the finalized New Year's card data from the RAM 17 to the printer 12.

The printer 12 prints (for example, prints in color) the data on a New Year's card using a thermal head thereof or thermally prints the data on a sheet of base paper for color printing using the thermal head thereof, and then provides a printout.

Finalized New Year's card data is thus output directly from the RAM 17. Displayed New Year's card data can therefore be output quickly, and a printed New Year's card can be seen immediately. Moreover, since the New Year's card data can immediately be output to a sheet of base paper for printing, no extra work is needed and processing time is shortened.

After New Year's card data is finalized, when a "Correction" key displayed in the finalization screen is pressed, a part can be corrected using a known correction facility. When a "Return-to-preceding screen" key is pressed, the finalization screen is returned to a screen before finalization. In this case, the finalization screen may be returned to a preceding screen in order to change a part.

Figure 21:
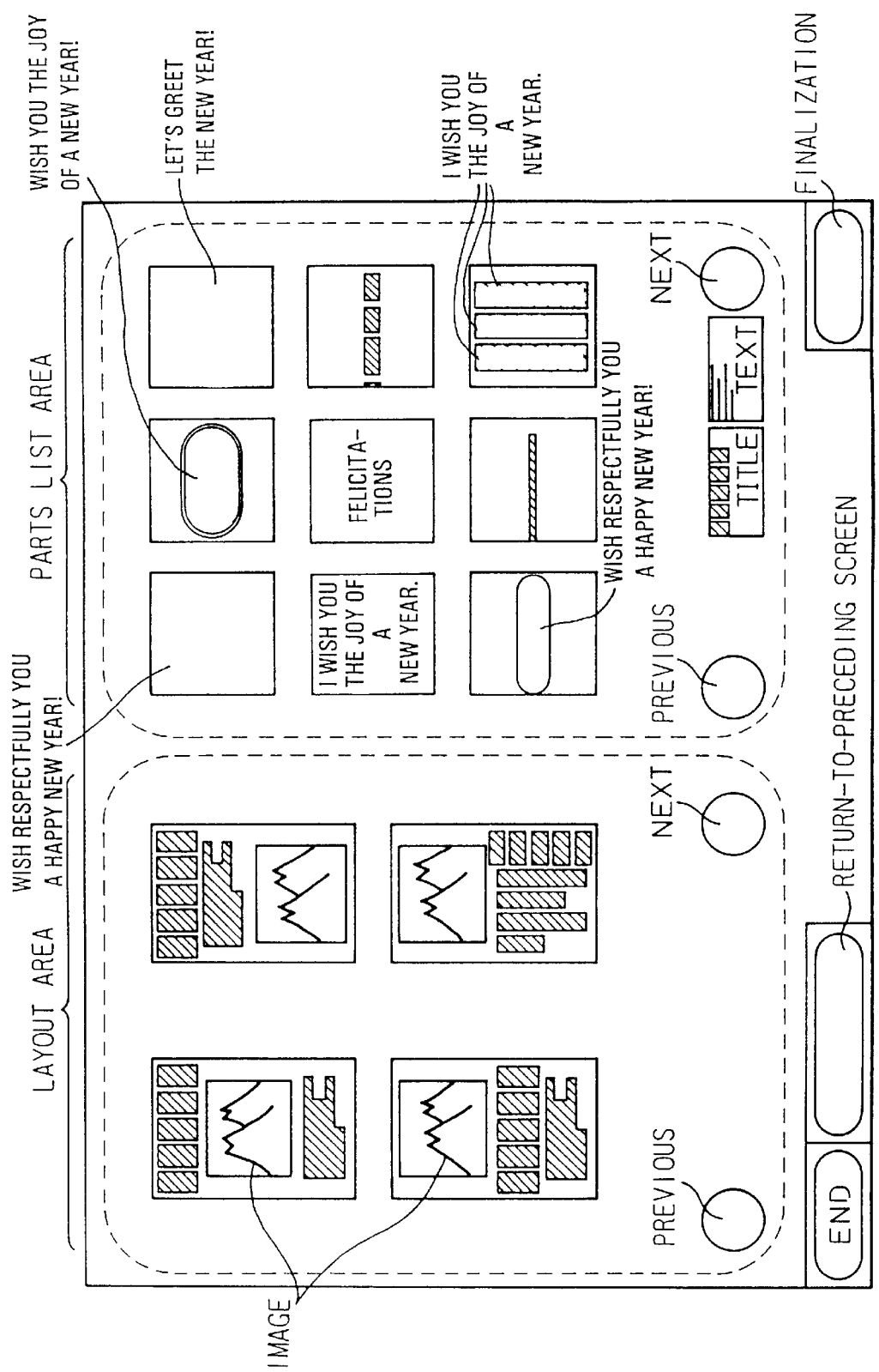
FIG. 21 shows an example of an image insertion screen in the embodiment.

FIG. 21 shows an example of an image insertion screen. This example is an example of a screen in which an image fetched from an image scanner is inserted into an associated field in each layout. In this case, the image corresponds to a part of part attribute (1) (illustration). The image is inserted in place of an illustration.

For inserting an image into an associated field in each layout as mentioned above, after the item of, for example, "Scanner New Year's Card" is selected from the menu, an image provided by the scanner is inserted into layouts by performing the same processing as that for an illustration.

Moreover, a video picture fetched from a video camera can be inserted into layouts in place of an image fetched from the scanner in the same manner as that mentioned above. In this case, when the item "Video New Year's Card" is selected from the menu, a video picture can be inserted into an associated field in each layout in the same manner as that mentioned above.

As mentioned above, for inserting an image fetched from a scanner, or a video picture fetched from a video camera into layouts, the CPU 14 edits image data input from the scanner or video camera according to layout data (position, size, and the like), and outputs the edited data to the display 13. Thus, any image can be inserted as a part into an associated field in each layout.

Figure 22:
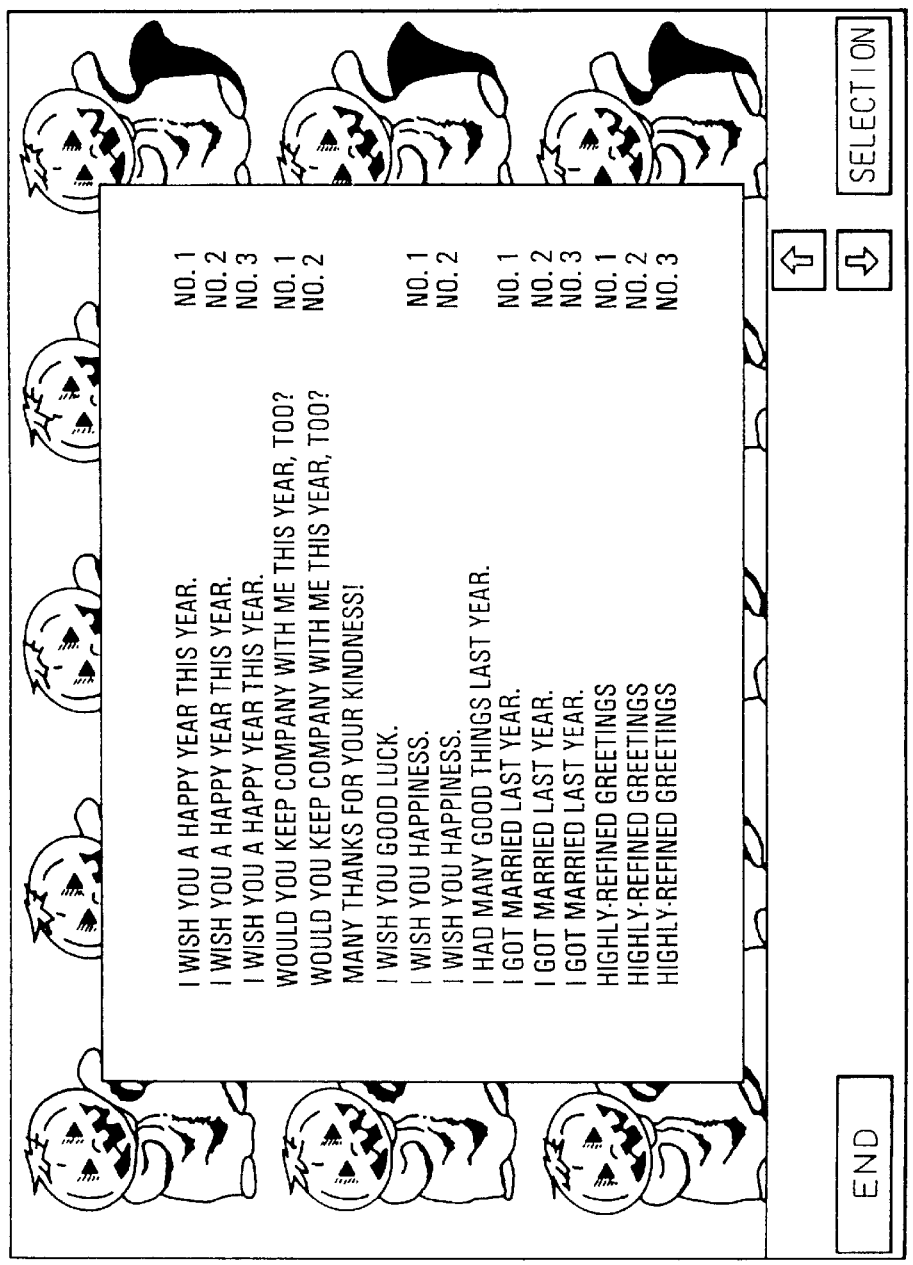
FIG. 22 shows an examples of a screen provided by an original documentation support facility in the embodiment.

FIG. 22 shows an example of a screen provided by an original documentation support facility. The original documentation support facility is a facility for supporting creation of a text that becomes an object of insertion when any sentence other than texts prepared in advance is inserted as a text into a field in each layout.

The facility is a facility selected by pressing the Original key displayed in the screen shown in FIG. 17. When this facility is selected, a menu of supported sentences (in Japanese) is, as shown in FIG. 22, displayed. In this screen, a plurality of phrases (in Japanese) for composing a text are displayed. An operator selects any sentences, and combines the selected sentences, whereby an original document is created automatically.

Figure 23:
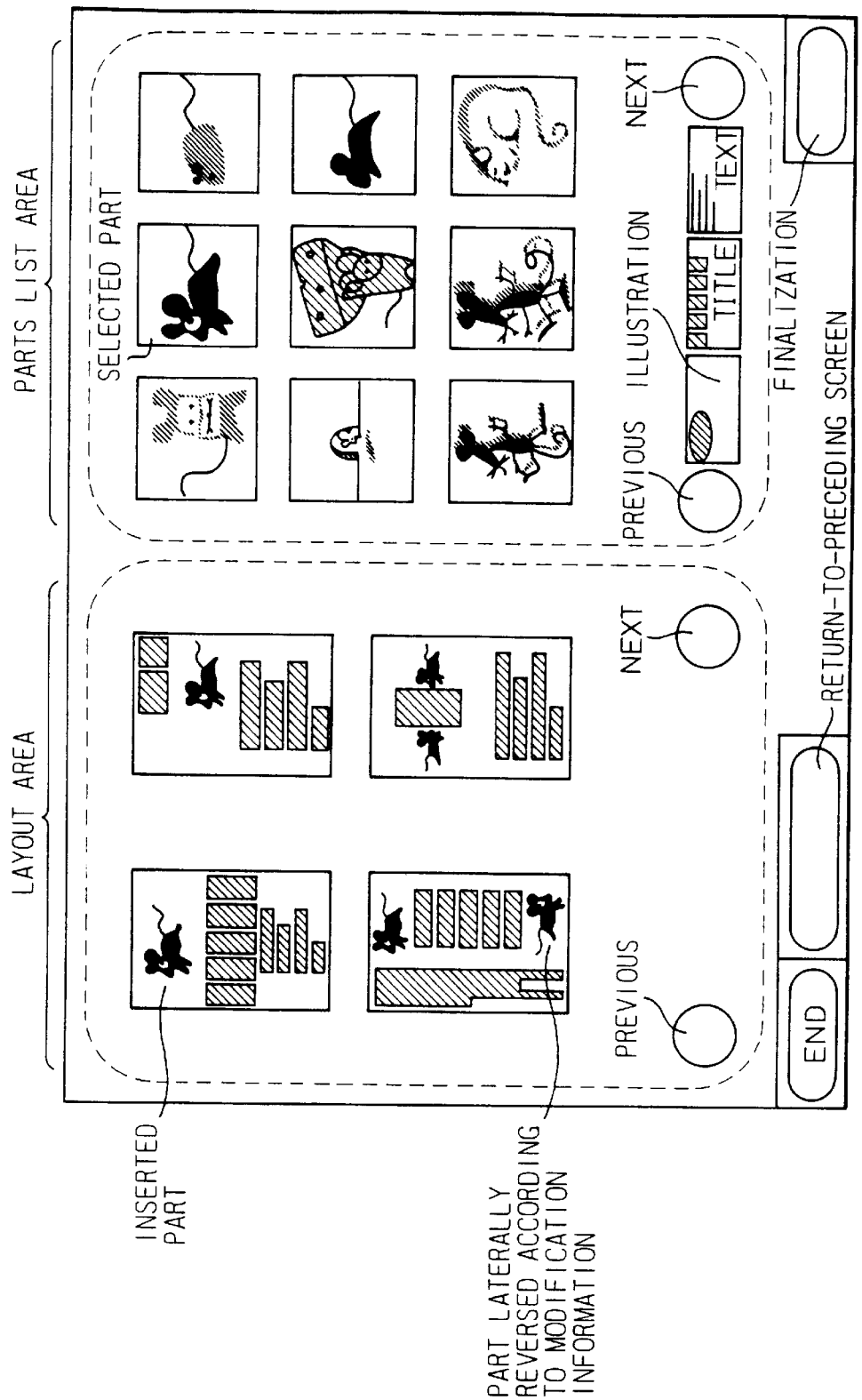
FIG. 23 shows an example of a screen dependent on modification information in the embodiment.
Figure 24:
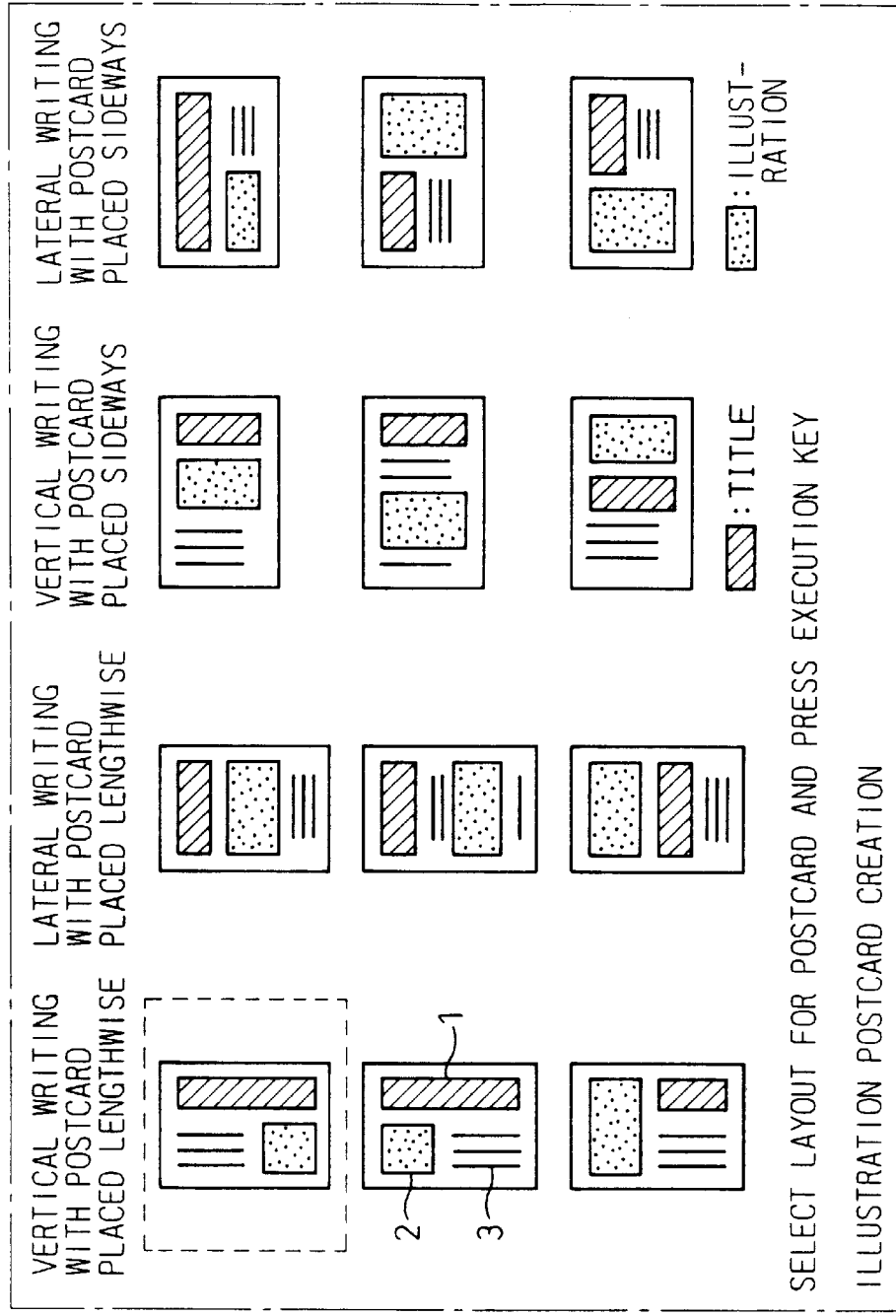
FIG. 24 shows a layout selection screen in a prior art.

FIG. 23 shows an example of a screen based on modification information. This example is an example in which mice of part attribute (1) (illustration) are displayed in the parts list area, one of the illustrations of a mouse is selected, and paired illustrations of the mouse, that is, the selected illustration and an illustration serving as a modified part are displayed in fields in each of two layouts. In this case, the illustration of the mouse selected from the list of parts is laterally reversed according to modification information and then inserted into an associated field in a layout.

Assuming that lateral reversal information is set as modification information, when one illustration (a mouse facing left in the drawing) is selected, not only the selected illustration (the mouse facing left in the drawing) but also an illustration (a mouse facing right in the drawing) made by laterally reversing the selected illustration (the mouse facing left in the drawing) are paired and inserted into fields in a layout.

In other words, when modification information contained in layout data is utilized, once one part is selected from a list of parts, two different parts (a pair of a mouse facing right and a mouse facing left) can be inserted simultaneously to associated fields in a layout. Consequently, a varied illustration can be inserted freely through simple manipulation.

The embodiment has been described so far. Alternatively, the present invention can also be implemented as described below.

(1) The present invention can be implemented not only in a word processor but also in a personal computer or the like.

(2) Data in the ROM may be stored in a memory medium such as a hard disk, and loaded in a RAM at the start of normal operation of the apparatus. The present invention can still be implemented.

(3) The printer can be realized with any other type of printer except when data is printed thermally on a sheet of base paper for printing.

(4) Document processing described in the embodiment can be adapted not only for creation of a New Year's card but also for composition of a print document for other various kinds of postcards (a postcard for inquiring after one's health in the hot season, an invitation card, a greeting card, and the like) or a print document for various kinds of cards (Christmas card and the like).

(5) In the embodiment, the display panel of the display is a touch-sensitive panel. The present invention is not limited to this example. The present invention can be implemented in an apparatus whose input unit is formed with a mouse or a keyboard.

As described previously, according to a novel document processing apparatus of the present invention, the advantages below are available.

(1) Since parts of a selected part attribute are displayed as a list of parts as they are (they are not expressed as characters as they are in the prior art), the parts capable of being inserted into fields in layouts can be discerned readily. Consequently, a part to be inserted into fields in layouts can be selected easily, and layout can be achieved readily.

(2) Parts displayed as a list of parts are changed to other parts immediately by performing the manipulation for changing part attributes. Even if a plurality of part attributes are provided, they can be changed readily and parts of a selected attributes can be displayed readily. Consequently, a layout can be achieved easily and quickly.

(3) Layout can be achieved visually merely by selecting any item from each menu displayed on a display screen. The manipulation for designing a postcard, card, or the like is therefore simple. Any design can be created readily by visually grasping information on the display screen.

(4) When a page of layouts is switched to another page, a selected part is automatically inserted into switched layouts. Consequently, an operator is relieved from extra work and manipulation becomes simpler.

(5) Using modification information contained in layout data, although the number of parts to be selected from a list of parts is one, a modified part can be inserted simultaneously with the selected one. An operator's work and time can therefore be saved.

(6) According to a present invention, the document/design processing unit includes a layout/parts list display control means and a part insertion means. Parts of a designated part attribute are displayed as a list of parts as they are. The parts capable of being inserted to fields in layouts can be discerned readily. Moreover, since a selected part is inserted into fields in layouts immediately, the layouts can be checked readily.

(7) According to a second aspect of the present invention, the layout/parts list display control means includes a control facility that, when layouts to be displayed in the layout area or a list of parts to be displayed in the parts list area occupies a plurality of pages, updates a page according to input page turn information and displays layouts and a list of parts for each page. Even if an amount of display data is large, the data can be switched and displayed through simple manipulation.

(8) According to a third aspect of the present invention, the layout/parts list display control means includes a control facility that, when part attribute change information for changing the attribute of parts displayed in the parts list area is input, changes the part attribute of all parts contained in a displayed list of parts into other part attributes according to the part attribute change information. Consequently, part attributes can be changed through simple manipulation, and a part to be inserted into fields in layouts can be selected readily.

(9) According to a fourth aspect of the present invention, the part insertion means includes a control facility such that, when there are a plurality of pages of layouts, if one page of layouts displayed in the layout area is turned to another with input of page turn information, the selected part is inserted into associated fields in all layouts displayed in a new page. Even when pages are turned, a part is always inserted into layouts displayed. The layouts can be checked visually and readily.

(10) According to a fifth aspect of the present invention, the part insertion means has a control facility that, when part change information for changing a part selected from a list of parts into another part is input with displayed layouts fixed, inserts the selected part into associated fields in all currently-displayed layouts. Even when parts are changed, a new part is inserted into layouts immediately. Processing is therefore easy, and the layouts can be checked easily.

(11) According to a sixth aspect of the present invention, the part insertion means has a control facility that, when one part is selected from a list of parts, modifies the part according to modification information contained in layout data, and inserts the modified part into associated fields in all layouts displayed. Using modification information contained in layout data, although only one part is selected from a list of parts, a modified part can be inserted automatically. An operator's work and time can therefore be saved.

(12) According to a seventh aspect of the present invention, the part insertion means includes a control facility for inserting an image input from a scanner or a picture input from a video camera as a part into associated fields in all layouts displayed. Any image or the like can therefore be inserted as a part into layouts through simple manipulation. This is convenient.

(13) According to a eighth aspect of the present invention, the layout/parts list display control means includes a control facility for displaying original documents as parts in a list of parts so that any original document can be selected. The document/design processing unit includes a processing facility that, when a part of an original document is selected from the list of parts, supports creation of an original document using a documentation support facility. An original document can therefore be inserted into layouts readily. This is convenient.

(14) According to a ninth aspect of the present invention, a printer is connected to the main unit, and a RAM for work is included in the memory unit. Moreover, the document/design processing unit includes a control facility that produces data for the layout area in the RAM, and that, after a layout is finalized, if print output information is input, outputs the resultant layout data from the RAM directly to the printer. After a layout is finalized, the layout can therefore be seen quickly as a printout or the like.

(15) According to a tenth aspect of the present invention, part attributes of which parts are displayed as lists of parts are an illustration, title, and text. The layout is a layout for outputting the illustration, title, and text to a print medium such as a postcard, card, or sheet. A New Year's card or the like can therefore be created through simple manipulation while the process of creation is checked visually.

(16) According to a eleventh aspect of the present invention, a clock means is included. The layout/parts list display control means changes part data to be read first from the memory means from one data to another according to information indicated by the clock means. A part to be displayed (for example, data of a sign of a year) can be changed from one part to another automatically according to clock information. This is convenient.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A document processing apparatus having a memory unit to store layout data for laying out a document and part data corresponding to parts capable of being inserted into layouts, comprising:
   a layout/parts list display control unit to define a layout area and a parts list area based on data stored in said memory unit, and to simultaneously display at least one layout in said layout area and a list of parts capable of being inserted into layouts in said parts list area; and
   a part insertion unit, wherein when a part is selected from a list of parts displayed in said parts list area, the part insertion unit inserts the selected part into associated fields in all layouts displayed in said layout area.

2. The document processing apparatus according to claim 1, wherein, when the layouts to be displayed in said layout area and the list of parts to be displayed in said parts list area occupy a plurality of pages, said layout/parts list display control unit updates a page according to input page turn information, and displays layouts and a list of parts for each of the plurality of pages.

3. The document processing apparatus according to claim 1, wherein, when part attribute change information for changing an attribute of parts displayed in said parts list area is input, said layout/parts list display control unit changes the attribute of all parts contained in the displayed list of parts.

4. The document processing apparatus according to claim 1, wherein, when there are a plurality of pages of layouts, if a page of layouts displayed in said layout area is turned to a new page as a result of page turn information, the part insertion unit inserts said selected part into associated fields in all layouts displayed in the new page.

5. The document processing apparatus according to claim 1, wherein, when part change information for changing a part selected from the list of parts is input with displayed layouts fixed, said part insertion unit inserts the selected part into associated fields in all currently-displayed layouts.

6. The document processing apparatus according to claim 1, wherein the layout data stored in said memory unit is layout data containing modification information for modifying a part to be inserted into layouts, and wherein, when a part is selected from the list of parts, said part insertion unit modifies the selected part according to said modification information contained in the layout data, and inserts the modified selected part into associated fields in all layouts displayed.

7. The document processing apparatus according to claim 1, further comprising an external image input unit, wherein said part insertion unit inserts an image input from the external image input unit into associated fields in all layouts displayed.

8. The document processing apparatus according to claim 1, further comprising a document/design processing unit, wherein said layout/parts list display control unit displays original documents as parts in the list of parts so that any original document can be selected, and when a part of an original document is selected from said list of parts, said document/design processing unit creates an original document using a documentation support facility.

9. The document processing apparatus according to claim 1, further comprising:
   a main unit;
   a printer connected to the main unit;
   a RAM included in said memory unit; and
   a document/design processing unit that produces data for said layout area in said RAM, and that, after a layout is finalized, when printout information is input, outputs resultant layout data from said RAM directly to said printer.

10. The document processing apparatus according to claim 1, wherein attributes of parts displayed in said lists of parts include an illustration, a title, and a text, and said at least one layout is a layout to output said illustration, title, and text on a print medium such as a postcard, a card, or a sheet.

11. The document processing apparatus according to claim 1, further comprising a clock unit, wherein said layout/parts list display control unit changes the part data read first from said memory unit according to information indicated by said clock unit.

12. A method of processing documents comprising the steps of:

controlling a layout/parts list display so as to define a layout area and a parts list area on a screen of a display on the basis of stored data, and simultaneously displaying at least one layout in said layout area and a list of parts capable of being inserted into layouts in said parts list area, and inserting, when a part is selected from a list of parts displayed in said parts list area, the selected part into associated fields in all layouts displayed in said layout area.

13. A program storage device readable by a computer, tangibly embodying a program of instructions executable by the computer to process documents, said process comprising the steps of:

controlling a layout/parts list display so as to define a layout area and a parts list area on a screen of a display on the basis of stored data, and simultaneously displaying at least one layout in said layout area, and a list of parts capable of being inserted into layouts in said parts list area; and inserting, when a part is selected from a list of parts displayed in said parts list area, the selected part into associated fields in all layouts displayed in said layout area.

* * * * *